US009894223B2

(12) United States Patent
Iwaki et al.

(10) Patent No.: US 9,894,223 B2
(45) Date of Patent: Feb. 13, 2018

(54) SERVER SYSTEM, TERMINAL DEVICE, INFORMATION STORAGE DEVICE, METHOD FOR CONTROLLING SERVER SYSTEM, AND METHOD FOR CONTROLLING TERMINAL DEVICE

(71) Applicant: OLYMPUS CORPORATION, Tokyo (JP)

(72) Inventors: Hidekazu Iwaki, Hachioji (JP); Mitsunori Kubo, Hachioji (JP); Hisumi Esaki, Yokohama (JP); Takayuki Nakatomi, Chofu (JP); Arata Shinozaki, Hachioji (JP); Akio Kosaka

(73) Assignee: OLYMPUS CORPORATION, Tokyo (JP)

( * ) Notice: Subject to any disclaimer, the term of this patent is extended or adjusted under 35 U.S.C. 154(b) by 508 days.

(21) Appl. No.: 14/095,466

(22) Filed: Dec. 3, 2013

(65) Prior Publication Data

US 2014/0152854 A1   Jun. 5, 2014

(30) Foreign Application Priority Data

Dec. 4, 2012  (JP) ................................. 2012-265510

(51) Int. Cl.
*H04N 7/18*    (2006.01)
*H04N 7/173*   (2011.01)
*H04N 1/00*    (2006.01)

(52) U.S. Cl.
CPC ..... *H04N 1/00244* (2013.01); *H04N 1/00198* (2013.01); *H04N 2201/3225* (2013.01)

(58) Field of Classification Search
CPC ... H04N 1/00129; H04N 1/00244; G06F 3/14
See application file for complete search history.

(56) References Cited

U.S. PATENT DOCUMENTS 9,092,185 B2 *  7/2015  Mizuno ..................... G09G 5/00
9,305,024 B2 *  4/2016  Tseng ................ G06F 17/30247
(Continued)

FOREIGN PATENT DOCUMENTS

JP  2003-296701 A  10/2003
JP  2004-336343 A  11/2004
(Continued)

OTHER PUBLICATIONS

Office Action dated Aug. 2, 2016, issued in counterpart Japanese application No. 2012-265510, with English translation. (7 pages).

*Primary Examiner* — Tsion B Owens
(74) *Attorney, Agent, or Firm* — Westerman, Hattori, Daniels & Adrian, LLP

(57) ABSTRACT

A server system includes: a reception section that receives captured image information and metadata from a terminal device connected to the server system through a network, the captured image information being information about a captured image captured using the terminal device, and the metadata being added to the captured image; an insertion image selection section that selects an insertion image based on the received metadata, the insertion image being an image differing from the acquired captured image; and an image set generation section that generates image set information in which the insertion image is inserted into the captured image information.

5 Claims, 18 Drawing Sheets

(56) References Cited

U.S. PATENT DOCUMENTS

| | | | |
|---|---|---|---|
| 9,396,197 B2* | 7/2016 | Hwang | G06F 17/30058 |
| 9,400,805 B2* | 7/2016 | Knudson | G06F 17/30244 |
| 2004/0196502 A1 | 10/2004 | Mikawa | |
| 2007/0070408 A1 | 3/2007 | Ono et al. | |
| 2013/0205211 A1* | 8/2013 | Warren | G06Q 10/10 |
| | | | 715/719 |
| 2013/0222369 A1* | 8/2013 | Huston | G06T 17/00 |
| | | | 345/419 |
| 2013/0346869 A1* | 12/2013 | Asver | G06F 17/212 |
| | | | 715/730 |
| 2014/0019264 A1* | 1/2014 | Wachman | G06Q 30/0276 |
| | | | 705/14.72 |

FOREIGN PATENT DOCUMENTS

| | | |
|---|---|---|
| JP | 2007-116658 A | 5/2007 |
| JP | 2007-194966 A | 8/2007 |

* cited by examiner

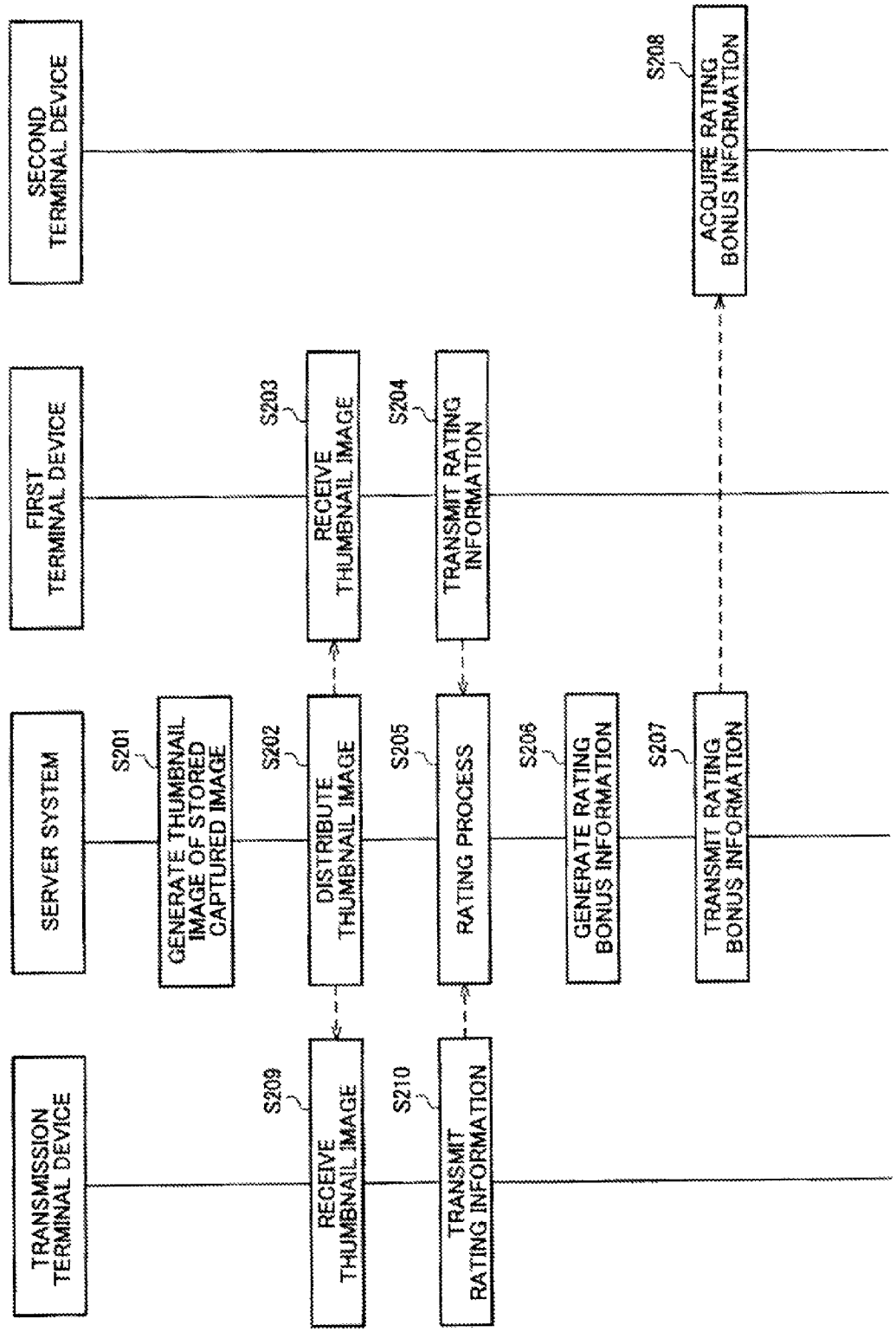

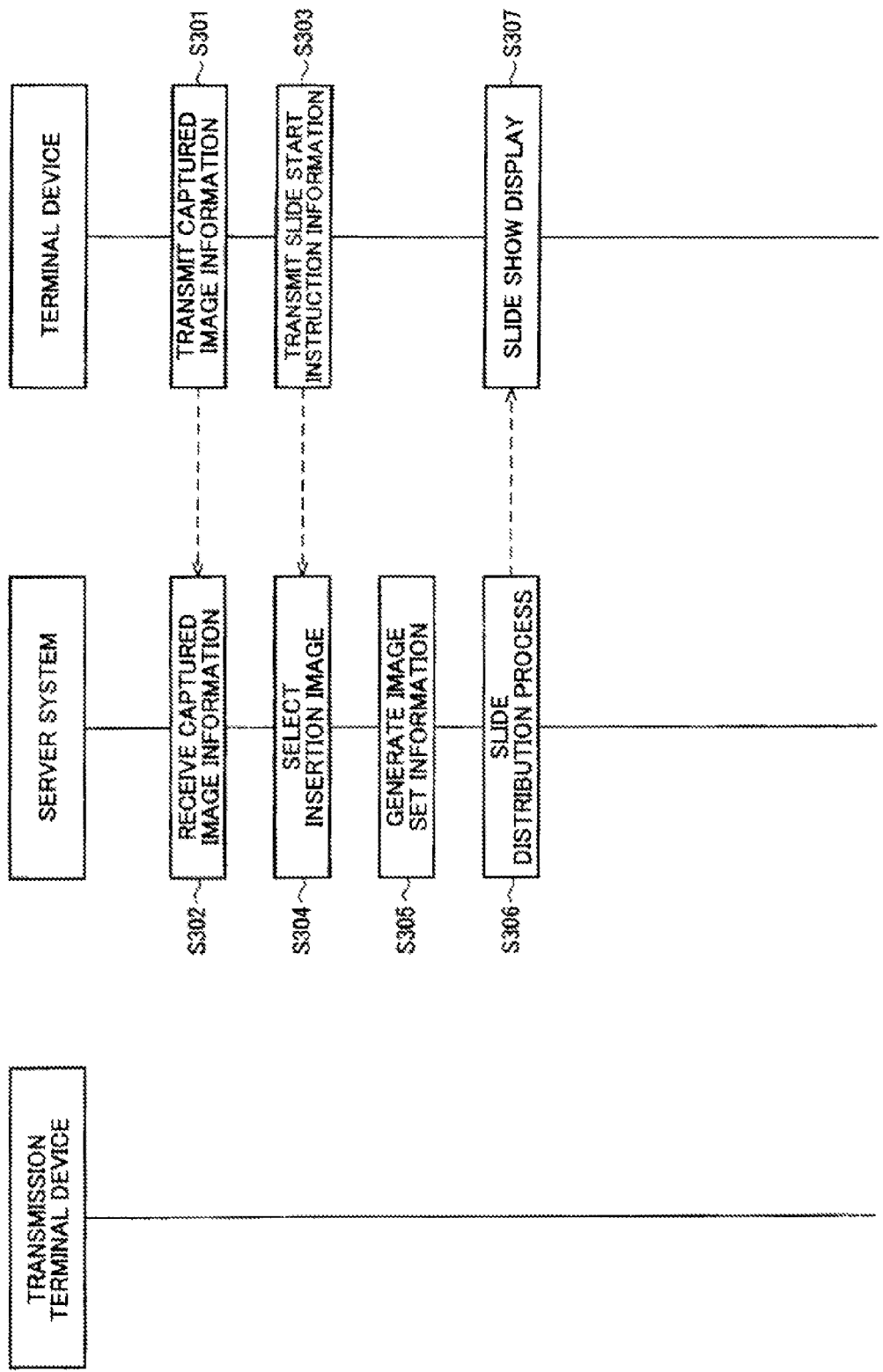

FIG. 17

| INFORMATION FOR GENERATING METADATA | METADATA | SPECIFIC RATING METHOD |
|---|---|---|
| TWEET DATA | POSTING TIME (TWEET TIME) | HIGHLY RATED WHEN CLOSE TO SHOOTING TIME |
| | TRANSMITTING TIME | HIGHLY RATED WHEN CLOSE TO SHOOTING TIME |
| | POSTING POSITION (TWEET POSITION) | HIGHLY RATED WHEN PREPARATION POSITION IS DISTANT FORM SHOOTING POSITION |
| | TWEET DATA | RELIABILITY AS KEYWORD THAT SPECIFIES IMAGE IS HIGH WHEN NUMBER OF WORDS EXTRACTED FROM TWEET DATA IS SMALL |
| | EXTRACTED WORD | CURRENT WORD, SEARCH WORD, AND THE LIKE |
| | WORD WEIGHTED BASED ON STATISTICAL DATA OR THE LIKE | HIGHLY RATED WHEN WORD HAVING HIGH SCORE IS INCLUDED |
| | CHARACTERS IN GIVEN NUMBER FROM HEAD/END | HIGHLY RATED WHEN SPECIFIC PATTERN IS INCLUDED |
| | ASCII ART (AA) OR EMOTICON | HIGHLY RATED WHEN ASCII ART (AA) OR EMOTICON IS INCLUDED |
| | TWEET DATA PREPARATION TIME | HIGHLY RATED WHEN LONG |
| SHOOTING INFORMATION | TIME ELAPSED FROM RECEPTION OF TWEET DATA TO SHOOTING | HIGHLY RATED WHEN SHORT |
| | NUMBER OF IMAGES CAPTURED UNTIL CAPTURED IMAGE WAS SENT | HIGHLY RATED WHEN LARGE |
| | CAMERA OPERATION HISTORY BEFORE SHOOTING | HIGHLY RATED WHEN LONG |
| | TIME ELAPSED FROM SHOOTING TO TRANSMITTING | HIGHLY RATED WHEN SHORT |
| | NORMALLY ACQUIRED INFORMATION (E.G., EXIF) | |
| BEHAVIORAL INFORMATION | TIME ELAPSED FROM RECEPTION OF TWEET DATA TO BROWSING | HIGHLY RATED WHEN SHORT |
| | SHOOTING POSITION OF IMAGE INFORMATION | HIGHLY RATED WHEN RARE |
| | MOVING DISTANCE BEFORE SHOOTING | HIGHLY RATED WHEN LONG |
| | NUMBER OF STEPS BEFORE SHOOTING | HIGHLY RATED WHEN LARGE |
| | SHUTTER HALF-PRESS TIME | HIGHLY RATED WHEN LONG (I.E. COMPOSITION WAS CAREFULLY SELECTED) |

FIG. 17 (CONT.)

| INFORMATION FOR GENERATING METADATA | METADATA | ACCURACY AND RELIABILITY | COLLECTION OF LARGE NUMBER OF IMAGES AND IMPROVEMENT IN MOTIVATION | VARIETY OF METADATA | QUICK (TIMELY) COLLECTION | IMAGE WITH STRONG FEELING OR WELL-SELECTED HIGH QUALITY IMAGE |
|---|---|---|---|---|---|---|
| TWEET DATA | POSTING TIME (TWEET TIME) | | | | O | |
| | TRANSMITTING TIME | | | | O | |
| | POSTING POSITION (TWEET POSITION) | O | | | | |
| | TWEET DATA | O | | | | |
| | EXTRACTED WORD | O | | O | | |
| | WORD WEIGHTED BASED ON STATISTICAL DATA OR THE LIKE | | | | | |
| | CHARACTERS IN GIVEN NUMBER FROM HEAD/END | | | O | | |
| | ASCII ART (AA) OR EMOTICON | | | O | | |
| | TWEET DATA PREPARATION TIME | O | | | | |
| SHOOTING INFORMATION | TIME ELAPSED FROM RECEPTION OF TWEET DATA TO SHOOTING | O | O | | O | |
| | NUMBER OF IMAGES CAPTURED UNTIL CAPTURED IMAGE WAS SENT | O | O | | | |
| | CAMERA OPERATION HISTORY BEFORE SHOOTING | O | O | | | |
| | TIME ELAPSED FROM SHOOTING TO TRANSMITTING | O | | | O | |
| | NORMALLY ACQUIRED INFORMATION (E.G., EXIF) | O | | O | | |
| | TIME ELAPSED FROM RECEPTION OF TWEET DATA TO BROWSING | O | | | O | |
| | SHOOTING POSITION OF IMAGE INFORMATION | O | | O | | |
| BEHAVIORAL INFORMATION | MOVING DISTANCE BEFORE SHOOTING | O | | O | | O |
| | NUMBER OF STEPS BEFORE SHOOTING | O | | O | | |
| | SHUTTER HALF-PRESS TIME | O | | | | O |

SERVER SYSTEM, TERMINAL DEVICE, INFORMATION STORAGE DEVICE, METHOD FOR CONTROLLING SERVER SYSTEM, AND METHOD FOR CONTROLLING TERMINAL DEVICE

Japanese Patent Application No. 2012-265510 filed on Dec. 4, 2012, is hereby incorporated by reference in its entirety.

BACKGROUND

The present invention relates to a server system, a terminal device, an information storage device, a method for controlling a server system, a method for controlling a terminal device, and the like.

In recent years, a large number of still images and moving images have been recorded, stored, and shared due to various factors such as a reduction in price of an imaging device (e.g., camera), and widespread use of a portable terminal device (e.g., smartphone) having an imaging function.

The image information may be stored using a storage on a network (e.g. a storage of a server system). In this case, it is unnecessary to increase the storage capacity of the imaging device or the like, and it is expected that the number of images to be shared increases by allowing many users to access the server system or the like. Moreover, smooth processing can be implemented even when the imaging device or the like has low processing capacity by causing the server system to perform image processing or the like on the shared image information.

A method has been known that causes a server system to generate an image set using images that have been captured by and sent from an imaging device or the like. The image set may be used to display a list of specific images (e.g., images having an attribute desired for the user) to the user, or may be used to implement a slide show that sequentially displays the images included in the image set.

Various techniques that efficiently generate the image set have been proposed taking account of limitations to the network bandwidth, the processing capacity of an imaging device or the like, and the like. JP-A-2004-336343 discloses a technique that reduces the communication time and the processing load during an image edit process by causing an imaging device and a server system to exchange a low-resolution thumbnail image instead of a high-resolution captured image. JP-A-2007-116658 discloses a technique that utilizes a low-resolution image in the same manner as in JP-A-2004-336343, and generates an image set (image collection) based on image information, and a technique that presents the generated image set to the user.

SUMMARY

According to one aspect of the invention, there is provided a server system comprising:

a reception section that receives captured image information and metadata from a terminal device connected to the server system through a network, the captured image information being information about a captured image captured using the terminal device, and the metadata being added to the captured image;

an insertion image selection section that selects an insertion image based on the received metadata, the insertion image being an image differing from the received captured image; and an image set generation section that generates image set information in which the insertion image is inserted into the captured image information.

According to another aspect of the invention, there is provided a terminal device comprising:

an image acquisition section that acquires a captured image;

a transmission section that transmits the captured image to a server system, metadata being added to the captured image;

a reception section that receives information from the server system; and a display control section that controls slide show display on a display section, the transmission section transmitting request information for the slide show display to the server system by transmitting captured image information that is information about a plurality of the captured images, the reception section receiving an insertion image sent from the server system in response to the request information, and the display control section controlling the slide show display of an image set that includes images specified by the captured image information and the insertion image.

According to another aspect of the invention, there is provided an information storage device storing a program, the program causing a computer to function as:

a reception section that receives captured image information and metadata from a terminal device connected through a network, the captured image information being information about a captured image captured using the terminal device, and the metadata being added to the captured image;

an insertion image selection section that selects an insertion image based on the received metadata, the insertion image being an image differing from the received captured image; and an image set generation section that generates image set information in which the insertion image is inserted into the captured image information.

According to another aspect of the invention, there is provided an information storage device storing a program, the program causing a computer to function as:

an image acquisition section that acquires a captured image;

a transmission section that transmits the captured image to a server system, metadata being added to the captured image;

a reception section that receives information from the server system; and a display control section that controls slide show display on a display section, the transmission section transmitting request information for the slide show display to the server system by transmitting captured image information that is information about a plurality of the captured images, the reception section receiving an insertion image sent from the server system in response to the request information, and the display control section controlling the slide show display of an image set that includes images specified by the captured image information and the insertion image.

According to another aspect of the invention, there is provided a method for controlling a server system comprising:

receiving captured image information and metadata from a terminal device connected to the server system through a network, the captured image information being information about a captured image captured using the terminal device, and the metadata being added to the captured image;

selecting an insertion image based on the received metadata, the insertion image being an image differing from the received captured image; and generating image set information in which the insertion image is inserted into the captured image information.

According to another aspect of the invention, there is provided a method for controlling a terminal device comprising:

performing an image acquisition process that acquires a captured image;

performing a transmitting process that transmits the captured image to a server system, metadata being added to the captured image;

performing a reception process that receives information from the server system and performing a display control process that controls slide show display on a display section, the transmitting process transmitting request information for the slide show display to the server system by transmitting captured image information that is information about a plurality of the captured images, the reception process receiving an insertion image sent from the server system in response to the request information, and the display control process controlling the slide show display of an image set that includes images specified by the captured image information and the insertion image.

BRIEF DESCRIPTION OF THE DRAWINGS

FIG. 6 is another view illustrating the flow of a process according to one embodiment of the invention.

FIG. 7 is yet another view illustrating the flow of a process according to one embodiment of the invention.

FIG. 17 is a view illustrating specific examples of metadata, and an application example of each metadata for a rating process.

DESCRIPTION OF EXEMPLARY EMBODIMENTS

Figure 1:
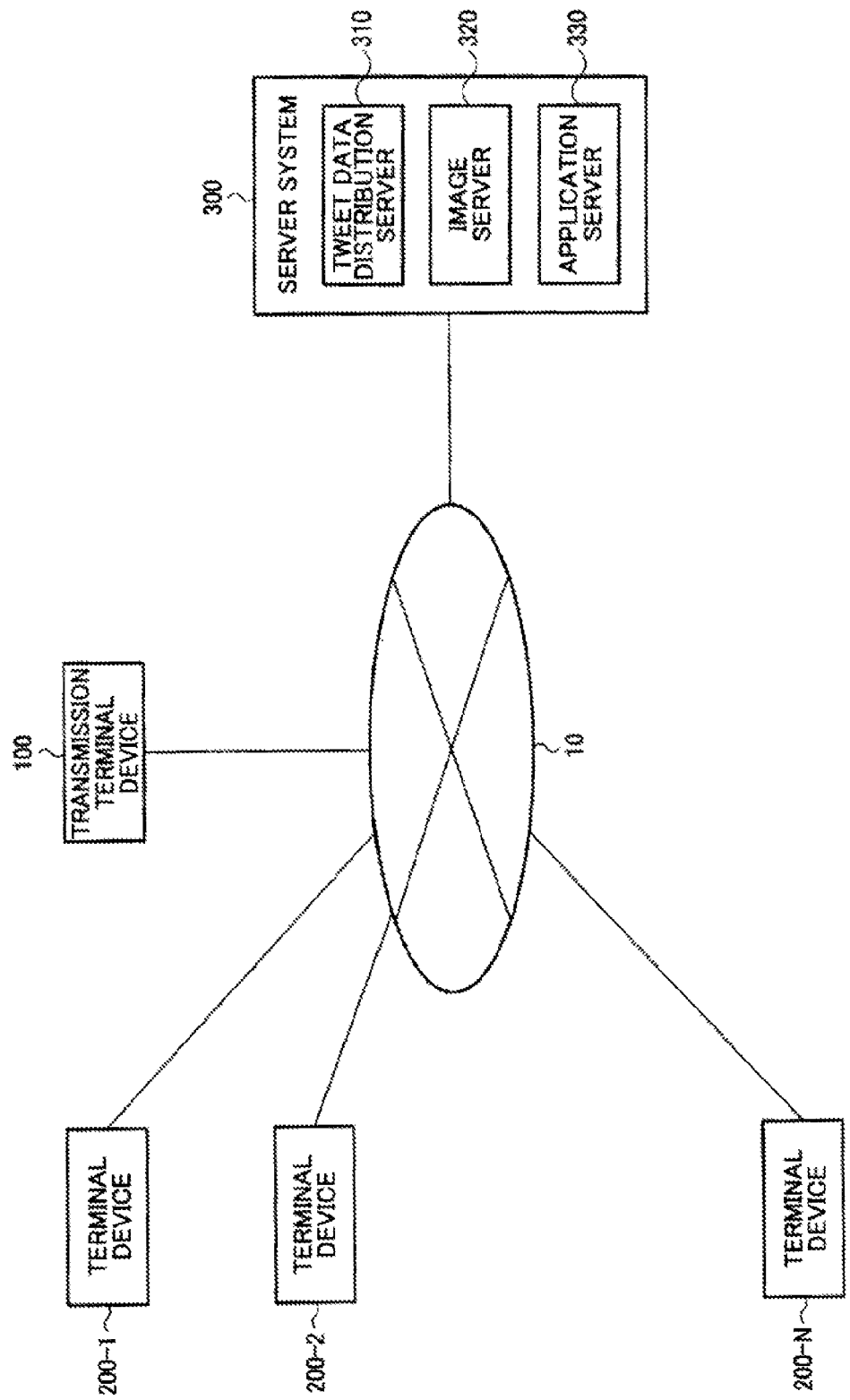
FIG. 1 illustrates a configuration example of an information processing system according to one embodiment of the invention that includes a terminal device and a server system.

Several aspects of the invention may provide a server system, a terminal device, an information storage device, a method for controlling a server system, a method for controlling a terminal device, and the like that generate image set information that includes an insertion image differing from a captured image based on captured image information about the captured image and metadata, for example.

According to one embodiment of the invention, there is provided a server system comprising:

a reception section that receives captured image information and metadata from a terminal device connected to the server system through a network, the captured image information being information about a captured image captured using the terminal device, and the metadata being added to the captured image;

an insertion image selection section that selects an insertion image based on the received metadata, the insertion image being an image differing from the received captured image; and an image set generation section that generates image set information in which the insertion image is inserted into the captured image information.

According to one embodiment of the invention, the server system receives the captured image information and the metadata, and selects the insertion image differing from the captured image indicated by the captured image information based on the metadata. The server system generates the image set information in which the insertion image is inserted between the captured images. According to the above configuration, an image other than the captured image indicated by the captured image information designated by the terminal device can be used as a candidate for an image included in the image set information, and a diversity of image set information can be generated, for example.

The server system may further comprise:

a transmission section that transmits shooting event start notification information sent from a transmission terminal device to the terminal device, the reception section may receive information about the captured image that has been captured using the terminal device corresponding to the shooting event start notification information as the captured image information.

This makes it possible to acquire information about the captured image corresponding to the shooting event start notification information as the captured image information.

In the server system, the insertion image selection section may select an image relating to a start notification transmission user who sent the shooting event start notification information using the transmission terminal device as the insertion image.

This makes it possible to select an image relating to the start notification transmission user as the insertion image.

In the server system, the transmission section may transmit social data sent from the transmission terminal device on a social networking service as the shooting event start notification information.

This makes it possible to use the social data as the shooting event start notification information.

In the server system, the social data may be tweet data.

This makes it possible to use the tweet data as the social data.

In the server system, the insertion image selection section may select the insertion image based on social data sent from the transmission terminal device as the metadata.

According to the above configuration, the insertion image can be selected based on the social data by utilizing the social data as the metadata, for example.

In the server system, the insertion image selection section may select the insertion image based on rating information about the captured image sent from the transmission terminal device as the metadata.

This makes it possible to utilize the rating information from the transmission terminal device as the metadata used to select the insertion image.

In the server system, the reception section may receive the captured image to which the metadata is added, the metadata being generated based on at least one of shooting information, behavioral information, and social data, the shooting information being information about shooting using the terminal device before or after reception of the social data, and the behavioral information being information about a behavior of a user of the terminal device before or after reception of the social data, and the insertion image selection section may select the insertion image based on the metadata.

This makes it possible to receive the metadata, and select the insertion image based on the received metadata.

The server system may further comprise:

a taste estimation section that performs a taste estimation process that estimates a taste of a user of the terminal device based on the shooting event start notification information that corresponds to the captured image when the captured image has been sent from the terminal device in response to the shooting event start notification information.

This makes it possible to implement the taste estimation process based on the start notification information, for example.

The server system may further comprise:

a taste estimation section that performs a taste estimation process that estimates a taste of a user of the terminal device based on the shooting event start notification information that corresponds to the captured image when the captured image has been sent from the terminal device in response to the shooting event start notification information, the taste estimation section may perform the taste estimation process based on information about a start notification transmission user who sent the shooting event start notification information using the transmission terminal device.

This makes it possible to implement the taste estimation process based on the information about the start notification transmission user, for example.

In the server system, the insertion image selection section may select the insertion image based on results of the taste estimation process performed by the taste estimation section.

This makes it possible to select the insertion image based on the results of the taste estimation process, for example.

In the server system, the reception section may receive information about a first captured image that has been captured using a first terminal device as the captured image information, and the insertion image selection section may select the insertion image based on rating information about the first captured image as the metadata, the rating information being sent from second to Nth (N is an integer equal to or larger than 2) terminal devices that differ from the first terminal device.

This makes it possible to utilize the rating information from another terminal device as the metadata used to select the insertion image.

In the server system, the reception section may receive request information for the image set information issued by a user of the terminal device from the terminal device, and the image set generation section may generate the image set information in response to the reception of the request information.

This makes it possible to utilize the request information from the terminal device for generating the image set information, for example.

In the server system, the reception section may receive slide start instruction information that requests start of slide show display on the terminal device as the request information, and the image set generation section may generate the image set information in response to the reception of the slide start instruction information.

According to the above configuration, when using the image set information for slide show display on the terminal device, the slide start instruction information can be used as the request information from the terminal device, for example.

The server system may further comprise:

a slide distribution section that performs a slide distribution process, the slide distribution process being a process that distributes the image set information for the slide show display on the terminal device to the terminal device, the slide distribution section may perform the slide distribution process on the image set information generated by the image set generation section in response to the reception of the slide start instruction information by the reception section.

According to the above configuration, when using the image set information for slide show display on the terminal device, necessary information can be distributed by performing the slide distribution process on the image set information, for example.

In the server system, the slide distribution section may perform a process that distributes a low-resolution insertion image as the slide distribution process when the reception section has received request information for low-resolution slide show display as the slide start instruction information, and may perform a process that distributes a high-resolution image corresponding to the captured image information and a high-resolution insertion image as the slide distribution process when the reception section has received request information for high-resolution slide show display as the slide start instruction information, the high-resolution slide show display displaying an image having a resolution higher than that of an image displayed during the low-resolution slide show display.

According to the above configuration, an appropriate slide distribution process can be performed corresponding to whether the request information for the low-resolution slide show display or the request information for the high-resolution slide show display has been received as the slide start instruction information, for example.

According to another embodiment of the invention, there is provided a terminal device comprising an image acquisition section that acquires a captured image:

a transmission section that transmits the captured image to a server system, metadata being added to the captured image;

a reception section that receives information from the server system; and a display control section that controls slide show display on a display section, the transmission section transmitting request information for the slide show display to the server system by transmitting captured image information that is information about a plurality of the captured images, the reception section receiving an insertion image sent from the server system in response to the request information, and the display control section controlling the slide show display of an image set that includes images specified by the captured image information and the insertion image.

According to the above embodiment of the invention, the terminal device transmits the captured image information that is the information about the captured image to which the metadata is added, and implements the slide show display using the insertion image that has been sent in response to the captured image information. According to the above configuration, the slide show display can be implemented using a diversity of image set information that includes an image other than the captured image indicated by the captured image information that was sent when requesting the slide show display, for example.

In the terminal device.

the reception section may receive shooting event start notification information from the server system, and the image acquisition section may acquire the captured image corresponding to the received shooting event start notification information.

According to the above configuration, the terminal device can acquire the captured image corresponding to the shooting event start notification infomnation.

According to another embodiment of the invention, there is provided an information storage device storing a program that causes a computer to function as each section described above.

According to another embodiment of the invention, there is provided a method for controlling a server system comprising:

receiving captured image information and metadata from a terminal device connected to the server system through a network, the captured image information being information about a captured image captured using the terminal device, and the metadata being added to the captured image;

selecting an insertion image based on the received metadata, the insertion image being an image differing from the received captured image; and generating image set information in which the insertion image is inserted into the captured image information.

According to another embodiment of the invention, there is provided a method for controlling a terminal device comprising:

performing an image acquisition process that acquires a captured image;

performing a transmitting process that transmits the captured image to a server system, metadata being added to the captured image;

performing a reception process that receives information from the server system and performing a display control process that controls slide show display on a display section, the transmitting process transmitting request information for the slide show display to the server system by transmitting captured image information that is information about a plurality of the captured images, the reception process receiving an insertion image sent from the server system in response to the request information, and the display control process controlling the slide show display of an image set that includes images specified by the captured image information and the insertion image.

Exemplary embodiments of the invention are described below. Note that the following exemplary embodiments do not in any way limit the scope of the invention laid out in the claims. Note also that all of the elements described in connection with the following exemplary embodiments should not necessarily be taken as essential elements of the invention.

1. Method

A method employed in connection with several embodiments of the invention is described below. In recent years, a large number of still images and moving images have been recorded, stored, and shared due to various factors such as a reduction in price of an imaging device (e.g., camera), and widespread use of a portable terminal device (e.g., smartphone) having an imaging function.

Various processes can be implemented by collecting a large amount of image information, and effectively utilizing the collected image information. For example, an acquired image classification process, a marketing strategy planning process, and the like can be implemented by creating an image database, and performing an analysis process based on the image database.

Note that several embodiments of the invention are assumed the widespread use of an imaging device and the like, and the term "image information" used herein refers to an image captured using an imaging device. It is important to provide an environment that prompts the user to capture an image and transmit the captured image to the server system in order to efficiently create an image database or the like.

Along with the widespread use of a network environment such as the Internet, the captured image information may be shared on the network utilizing a social networking service (SNS) environment or the like. The SNS may be a service that allows the users to communicate with each other by transmitting and receiving various types of data, for example. In this case, the image information sent by a given user is recorded and shared, and another user takes action (e.g., transmits comments). For example, when sharing the image information by utilizing an SNS, a server system may distribute shooting event start notification information, and efficiently acquire a large amount of image information from a plurality of terminal devices. In this case, it is desirable that the server system prompt the user to capture an image by distributing the shooting event start notification information, and performing a rating process on the image information sent from the terminal device in response to the shooting event start notification information, for example.

Specifically, when it is desired to prompt the user to capture an image, it is desirable to employ a technique that improves amusement instead of using a known technique directly when generating and providing an image set, for example. Various image set generation techniques have been known in the art. However, known techniques aim at generating an image set that is desired for the user.

In JP-A-2004-336343, the image set is generated by the operation performed by the user. In JP-A-2007-116658, the server system generates and presents the image set (e.g. selects images to be included in the image set, and disposes the images within the screen). However, the image set is generated from the images presented by the user. Specifically, it is considered that the user is not surprised when the image set generated using the known technique is presented to the user.

As described above, it has been a common technique in the art to cause a server system to generate and present an image set when presenting shared images to the user, for example. However, the known techniques do not take account of the importance of prompting or motivating the user to capture an image.

In order to solve the above technical problem, several embodiments of the invention propose a technique that acquires captured image information about a captured image (i.e., information about a candidate for an image included in an image set) from a terminal device, and generates an image set that includes an insertion image differing from the captured image (i.e., an image set into which an insertion image differing from the captured image is inserted) based on metadata added to the captured image. Since the insertion image is an image differing from the captured image, the user cannot expect that the image set includes the insertion image. Specifically, since an unpredictable image can be presented when the user browses the image set, the user is more interested in browsing the image set, and is motivated to utilize the image set. This makes it possible to motivate the user to use the system that provides the image set (e.g., an image sharing service implemented by an SNS), and increase the amount of image information sent to the server system. In this case, it is also effective to use an image that is unpredictable and valuable for the user as the insertion image.

Note that efficient image collection may be implemented by causing the server system to distribute the shooting event start notification information to control the start of the shooting event. The shooting event start notification information may be social data (tweet data in a narrow sense) that is sent on a social networking service (SNS). The term "social data" used herein refers to data posted by the SNS user. An SNS provides a background and an accompanying service for a plurality of users to interact and communicate. Therefore, the term "social data" used herein may refer to data for the transmitter to present his/her idea or the like to a specified or unspecified recipient.

It is considered that the social data is typically text data that expresses the thoughts and feelings of the user. Note that the social data is not limited thereto. The social data may also be photograph data or movie data. When the social data is text data, the social data may include only one word. However, it is considered that the social data normally includes a sentence that consists of a plurality of clauses since the social data is information that is sent aimed at communication or the like. When the social data is character string data, the character string data may include reference information (link) about photograph data, movie data, or the like. A system (e.g., specific service) that is used to post the social data is not limited. Specifically, the server system according to several embodiments of the invention may be configured to include a tweet service server that receives, stores, and distributes the social data from each user to provide an SNS that implements distribution of the social data. Alternatively, the server system according to several embodiments of the invention may not provide an SNS for posting and browsing the social data, and may acquire social data managed by another SNS.

The term "tweet data" used herein refers to one type of social data. The term "tweet data" used herein refers to multimedia data that includes at least text data that has been posted on an SNS and typically expresses the thoughts and feelings of the user. The term "tweet data" used herein also includes a message posted on the communication service "Twitter". The following description is given taking the tweet data as an example of the social data. Note that the social data may be data other than the tweet data (e.g., image data that does not include text data, or movie data), and the term "tweet data" may be replaced with social data other than the tweet data.

Since the tweet data is used to express the thoughts and feelings of the transmitter, for example, the degree of freedom of the tweet data is very high as compared with a known scene/shooting list. Note that the tweet data may be automatically generated by a computer by combining current articles (events) (e.g., a program referred to as "BOT"). In this case, the tweet data does not express the thoughts and feelings of the transmitter. However, the degree of freedom of the tweet data is as high as the tweet data posted by the user.

A technique has been used that provides a scene/shooting list in advance, and improves the utility of the acquired image information (i.e., improves the accuracy of the metadata added to the image information) by capturing image information that coincides with the shooting list or the like. However, an improvement in utility of the image information due to the scene/shooting list has been limited since the information lacks diversity, editing by the user who captures an image is not taken into account, and the number of users who utilize the shooting list or the like is limited (i.e., the amount of acquired image information is limited).

In contrast, the number of types of metadata included in the image database can be increased by adding metadata generated from the tweet data to an image that has been captured corresponding to the tweet data. It is also possible to link a larger mnumber of pieces of image information to single tweet data by distributing the tweet data to a larger number of users. Therefore, when generating metadata from the tweet data, a large number of pieces of image information are linked to single metadata, and the utility of the image database is improved (e.g., the accuracy of an analysis process that utilizes the image database is improved).

A configuration example of an information processing system that includes a terminal device and a server system, the flow of an image information collection process, the flow of a rating process, and the flow of an image set generation process are described below in this order. Note that the image information collection process and the rating process are not limited to those described below. The image information collection process and the rating process may be replaced with another process, or may be omitted, for example. A specific image set generation process and various modifications are also described below. An example of a service that utilizes the method according to several embodiments of the invention, and the like are also described below.

The following description is given using the tweet data as an example of the shooting event start notification information. Note that the start notification information is not limited to the tweet data. The tweet data may be replaced with another start notification information.

2. System Configuration Example

FIG. 1 illustrates a configuration example of an information processing system according to one embodiment of the invention that includes a terminal device (e.g. 200-1) a server system 300, and the like. The information processing system includes a transmission terminal device 100 that transmits the tweet data (shooting event start notification information in a broad sense; hereinafter the same), a plurality of terminal devices (200-1 to 200-N) that receive the tweet data, and the server system 300, the transmission terminal device 100, the plurality of terminal devices (200-1 to 200-N), and the server system 300 being connected through a network 10.

The transmission terminal device 100 is a terminal device operated by a tweet data transmitter. The transmission terminal device 100 may be a PC, or may be a portable communication terminal device such as a smartphone, or may be another device that allows the user to input and transmit the tweet data.

The terminal devices 200-1 and the like are devices that receive the tweet data, and allow the user to capture and transmit image information that corresponds to the tweet data.

In FIG. 1, the terminal devices 200-1 and the like are connected directly to the network 10. Note that the configuration is not limited thereto. The terminal devices 200-1 and the like may be connected to the network 10 through another device. For example, the terminal device 200-1 may be an imaging device that does not have a communication function, and may be connected to a PC that has a communication function. In this case, the PC acquires the tweet data through the network 10, and forwards the acquired tweet data to the imaging device connected to the PC via a cable or wireless communication. The user of the imaging device captures image information that corresponds to the forwarded tweet data. It is considered that the imaging device is not connected to the PC when the user captures the image information since the user normally desires to capture a diversity of objects, and it is convenient to the user. In this case, the imaging device is connected to the PC again after the image information has been captured, and the image information is sent from the imaging device to the PC. The PC then transmits the image information to the server system 300.

Figure 2:
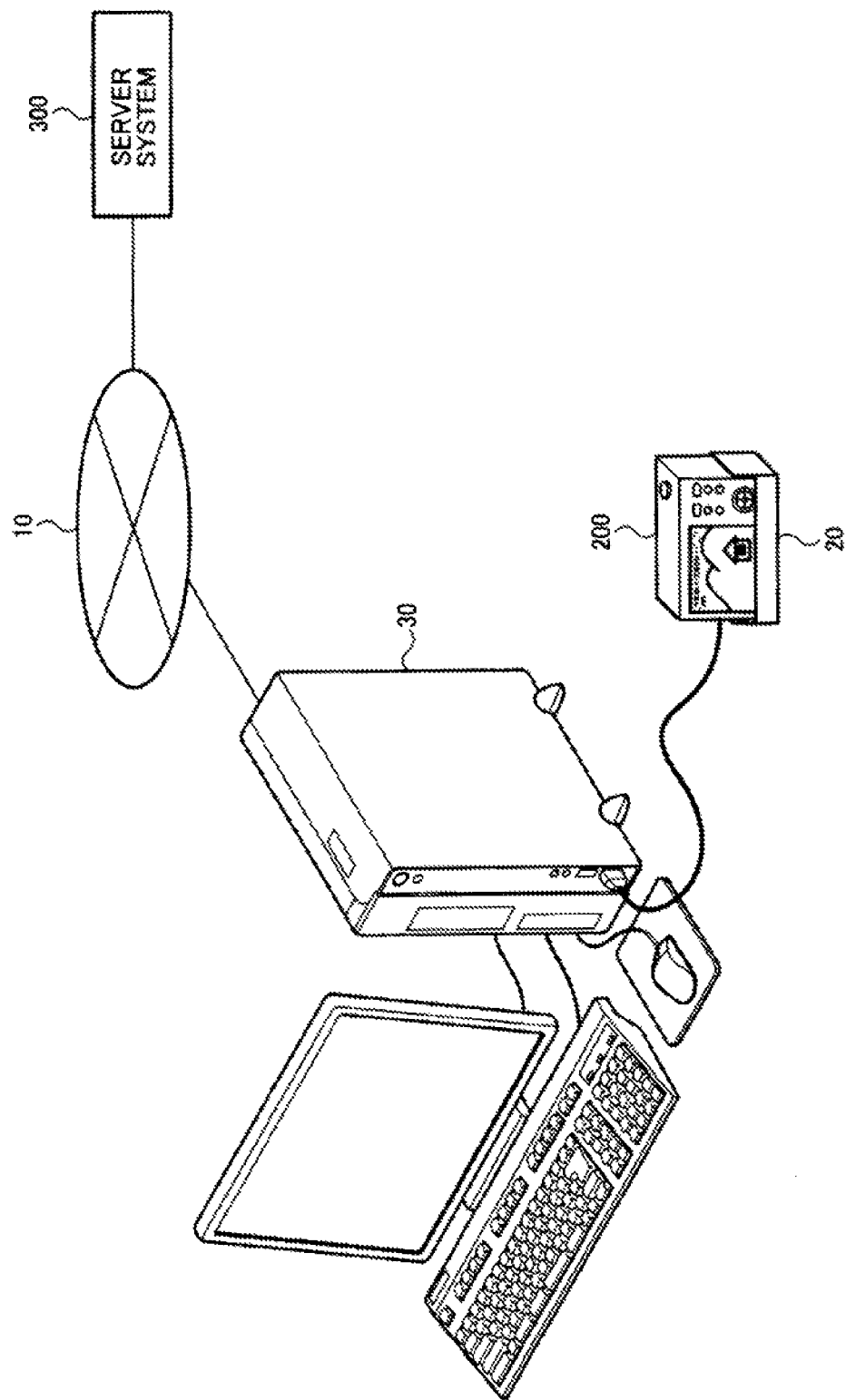
FIG. 2 illustrates an example of connection between a terminal device and a server system when the terminal device does not have a communication function.

As illustrated in FIG. 2, a PC 30 that is connected to the server system 300 through the network 10 is connected to an imaging device, for example. The PC 30 and the imaging device may be connected using a USB terminal, for example. As illustrated in FIG. 2, the imaging device may be placed on a cradle 20 that is connected to the USB terminal of the PC 30 via a cable. Note that the PC 30 and the imaging device may be connected using various methods other than the method illustrated in FIG. 2.

The server system 300 generates image set information based on the captured images and metadata sent from the terminal devices 200-1 and the like. The server system 300 may acquire and distribute the tweet data, and acquire the captured image corresponding to the tweet data, for example. As illustrated in FIG. 1, the server system 300 may include a tweet data distribution server 310, an image server 320, and an application server 330, for example.

The tweet data distribution server 310 receives the tweet data sent from the transmission terminal device 100. When the server system 300 provides a SNS for sharing the tweet data (i.e., a communication service that allows the users to share images, and exchange the tweet data), it is considered that the tweet data distribution server 310 receives the tweet data directly from the transmission terminal device 100. The tweet data distribution server 310 may receive the tweet data on another SNS that allows the users to transmit and receive the tweet data, for example. In this case, the transmission terminal device 100 may transmit the tweet data to an external server that is not included in the server system 300, and the tweet data distribution server 310 may receive the tweet data from the external server. The tweet data distribution server 310 distributes the received tweet data to the terminal devices 200-1 to 200-N.

The image server 320 acquires the captured images (image information) from the terminal devices 200-1 to 200-N. It is considered that metadata is added to the captured images taking account of construction of an image database and the like. Note that detailed description of a metadata addition method and the like is omitted. The metadata may be added in various ways. For example, the terminal devices 200-1 to 200-N may add the metadata to the captured images, or the image server 320 may generate the metadata, and add the generated metadata to the captured images. The image server 320 also stores the captured images.

The application server 330 provides various applications for prompting the users of the terminal devices 200-1 to 200-N to transmit the image information, for example. The application server 330 generates the image set information, and performs a slide distribution process and the like. The application server 330 may provide a service site (e.g., website) that allows the users to browse the captured images sent from a given terminal device, provide a captured image rating system that utilizes the service site and the like, and generate and transmit bonus information to the user who sent the captured image having a high rating, for example.

Figure 3:
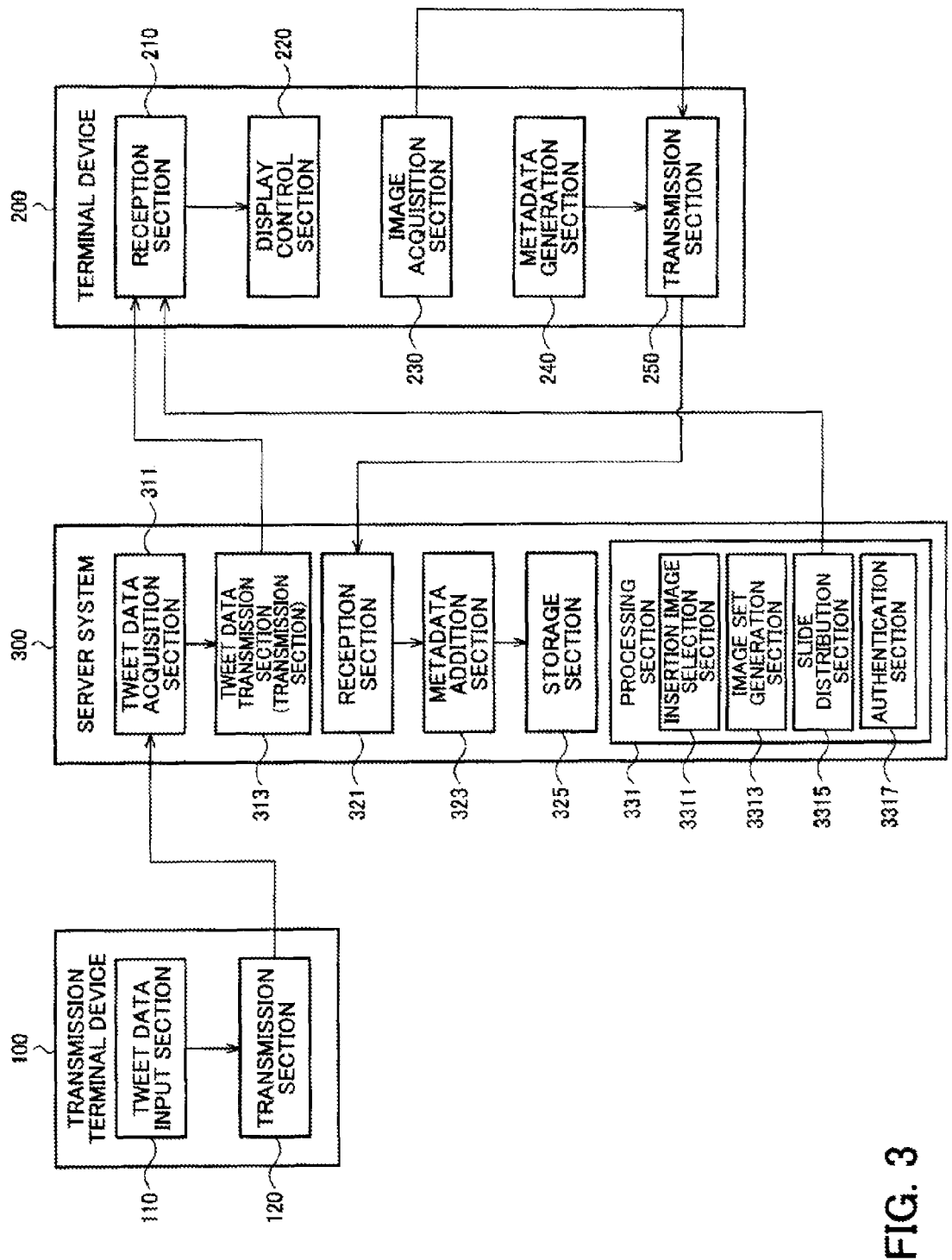
FIG. 3 illustrates a detailed configuration example of a transmission terminal device, a terminal device, and a server system according to one embodiment of the invention.

FIG. 3 illustrates a detailed configuration example of the transmission terminal device 100, the terminal device 200 (one of the terminal devices 200-1 to 200-N), and the server system 300. Note that the transmission terminal device 100 and the like are not limited to the configuration illustrated in FIG. 3. Various modifications may be made of the configuration illustrated in FIG. 3, such as omitting some of the elements illustrated in FIG. 3, or adding other elements.

The transmission terminal device 100 includes a tweet data input section 110 and a transmission section 120. The tweet data input section 110 allows the tweet data transmitter to input the tweet data. The transmission section 120 transmits the input tweet data. The transmission section 120 may transmit the input tweet data to the server system 300, an external server that is not included in the server system 300, or the like.

The terminal device 200 includes a reception section 210, a display control section 220, an image acquisition section 230, a metadata generation section 240, and a transmission section 250.

The reception section 210 receives the tweet data sent from a tweet data transmission section 313 (described later) of the server system 300. When a slide to show is displayed on the terminal device 200 based on the image set information, the reception section 210 receives slide distribution information from a slide distribution section 3315 of the server system 300.

Figure 4:
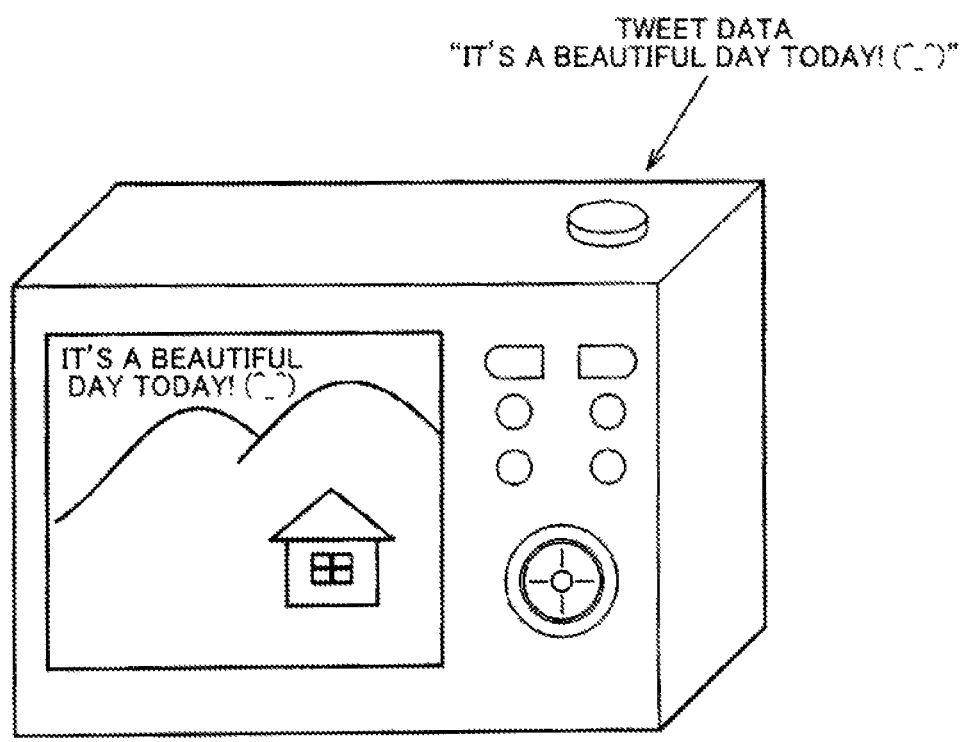
FIG. 4 illustrates an example in which tweet data is displayed on a display section of a terminal device.

The display control section 220 displays the received tweet data on a display section. FIG. 4 illustrates an example of a screen displayed on the display section under control of the display control section 220. FIG. 4 illustrates a case where the terminal device 200 is an imaging device that includes a display section on the rear side. In this case, the display control section 220 displays the tweet data on part of the display section. In the example illustrated in FIG. 4, the display control section 220 performs a display control process for utilizing the display section as a finder of the imaging device (i.e., a display control process that displays a house and a landscape (e.g., mountain) (i.e., capturing target)) while displaying the tweet data in the upper part of the screen. Note that the display method is not limited thereto. When the tweet data includes a link to a movie or the like, the link may be displayed, or the movie or the like indicated by the link may be displayed. When the number of characters included in the tweet data is large, only part of the characters may be displayed, or the characters may be displayed via scroll display, for example.

When a slide show is displayed on the terminal device 200 based on the image set information, the display control section 220 performs a display control process that controls the slide show using the slide distribution information.

The image acquisition section 230 acquires the captured image that has been captured by the user based on the tweet data displayed under control of the display control section 220. The metadata generation section 240 generates the metadata that is added to the captured image acquired by the image acquisition section 230. The metadata may be generated using various known methods, and detailed description thereof is omitted.

The transmission section 250 transmits the captured image acquired by the image acquisition section 230 and the metadata generated by the metadata generation section 240 to the server system 300. When a slide show is displayed on the tenuinal device 200 based on the image set information, and the user has input slide start instruction information, the transmission section 250 transmits the slide start instruction information to the server system 300.

The server system 300 includes a tweet data acquisition section 311, the tweet data transmission section (transmission section) 313, a reception section 321, a metadata addition section 323, a storage section 325, and a processing section 331.

The tweet data acquisition section 311 receives the tweet data sent from the transmission section 120 of the transmission terminal device 100. The tweet data transmission section 313 transmits the tweet data received by the tweet data acquisition section 311 to the terminal device 200. Although FIG. 3 illustrates an example in which the tweet data is sent to only the terminal device 200, the tweet data is sent to a plurality of terminal devices 200-1 to 200-N (see FIG. 1) in the actual situation. Note that the tweet data acquisition section 311 and the tweet data transmission section 313 may be included in the tweet data distribution server 310 illustrated in FIG. 1.

The reception section 321 receives the captured image from the transmission section 250 of the terminal device 200. When the metadata has been generated by the terminal device 200, the reception section 321 may receive the generated metadata together with the captured image. The metadata addition section 323 adds the metadata to the received captured image. The metadata added to the received captured image may be the metadata generated by the terminal device 200, or may be the metadata generated by the server system 300. The storage section 325 stores the captured image (particularly the captured image to which the metadata is added). The function of the storage section 325 may be implemented by a memory (e.g., RAM), a hard disk drive (HDD), or the like. Note that the reception section 321, the metadata addition section 323, and the storage section 325 may be included in the image server to 320 illustrated in FIG. 1.

The processing section 331 performs various processes implemented by the server system 300. The processing section 331 may be included in the application server 330 illustrated in FIG. 1, for example. The processing section 331 includes an insertion image selection section 3311, an image set generation section 3313, the slide distribution section 3315, and an authentication section 3317.

The insertion image selection section 3311 selects the insertion image based on captured image information sent from the terminal device 200, and the metadata added to the captured image indicated by the captured image information. The image set generation section 3313 generates the image set information based on the insertion image selected by the insertion image selection section 3311. The slide distribution section 3315 performs the slide distribution process that distributes an image and the like that are necessary for the slide show displayed on the terminal device 200 based on the image set information generated by the image set generation section 3313. The details of the processes performed by the insertion image selection section 3311, the image set generation section 3313, and the slide distribution section 3315 are described later.

The authentication section 3317 specifies and authenticates the target terminal device when transmitting the tweet data, acquiring the captured image, or performing the slide distribution process. For example, when the information processing system according to one embodiment of the invention is provided as part of a service (e.g., SNS), the authentication section 3317 determines whether or not the user who accesses the server system 300 is the legitimate user (registered user) of the service. For example, the tweet data transmission section 313 may transmit the tweet data to the terminal devices 200-1 to 200-N of the registered users based on registered user information retained by the authentication section 3317. When the terminal devices 200-1 to 200-N have accessed the server system 300 for transmitting the captured image, the reception section 321 may receive the captured image sent from the terminal device of the registered user, and may not receive the captured image sent from the terminal device of the non-registered user.

The server system 300 may perform a posted captured image rating process and the like. For example, the processing section 331 may include a rating section and a bonus information generation section (not illustrated in FIG. 3).

The rating section performs the rating process on the captured images sent from the terminal devices 200-1 to 200-N corresponding to the received tweet data. The bonus information generation section generates rating bonus information that is sent to the selected user among the users who operate the terminal devices 200-1 to 200-N based on the results of the rating process. The rating bonus information is information about a bonus given to the user who is highly rated as a result of the rating process (i.e., the user who sent the captured image having a high rating). It is desirable that the bonus (rating bonus information) have universal and high value common to the users who transmit the captured image using the method according to one embodiment of the invention. It is also effective to use an image having high value common to the users as the insertion image. In this case, the insertion image selection section 3311 may select the image information among the rating bonus information generated by the bonus information generation section as the insertion image.

3. Process Flow

Figure 5:
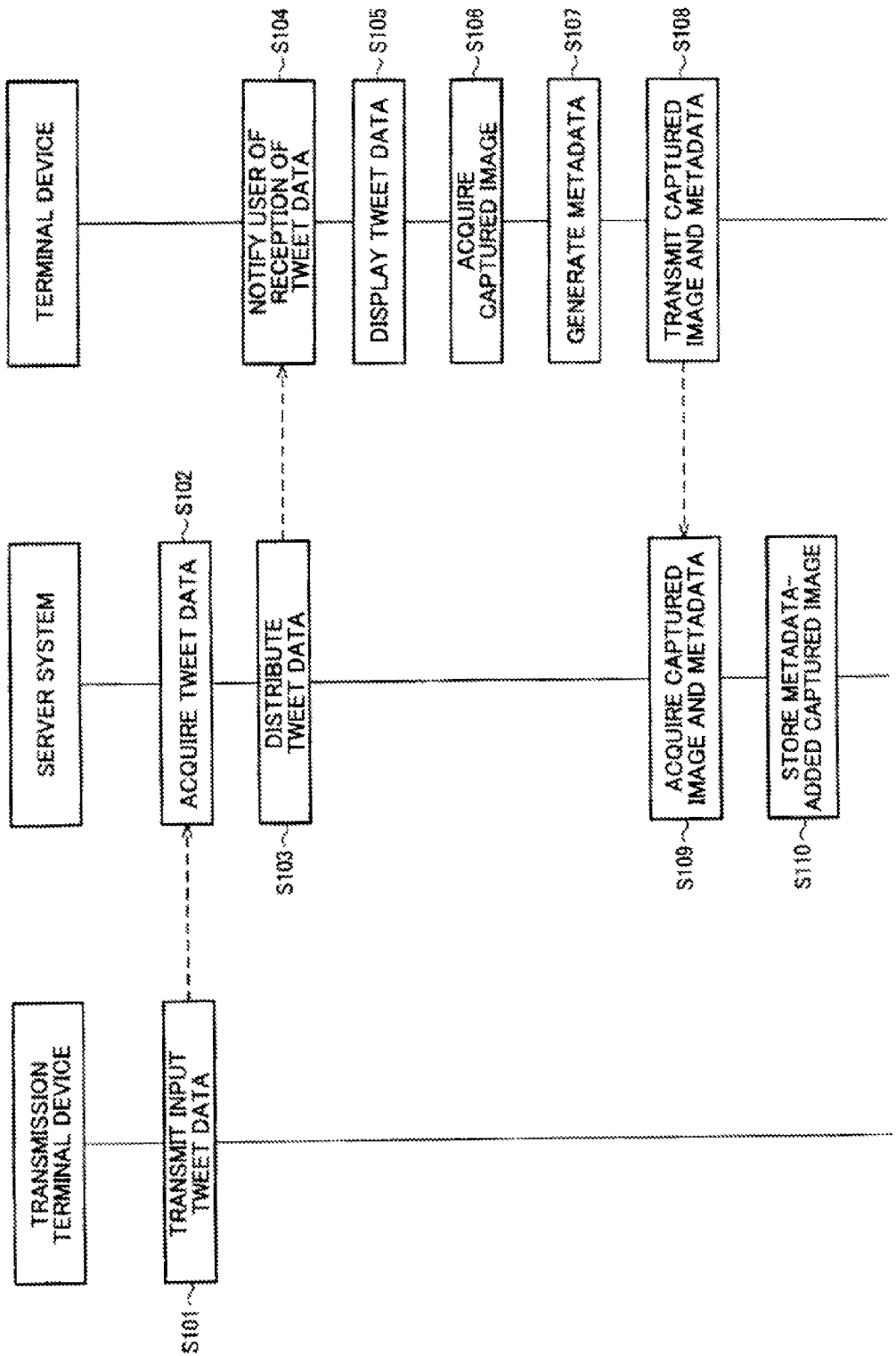
FIG. 5 is a view illustrating the flow of a process according to one embodiment of the invention.

The flow of the process according to one embodiment of the invention is described below with reference to FIGS. 5 to 7. FIG. 5 illustrates the flow of the captured image/metadata collection process, FIG. 6 illustrates the flow of the rating process, and FIG. 7 illustrates the flow of the image set generation process.

As illustrated in FIG. 5, the transmission terminal device 100 transmits the tweet data input by the user (S101). The server system 300 receives the tweet data sent from the transmission terminal device 100 either directly or through another server or the like (S102). The server system 300 distributes the received tweet data to the terminal device 200 (S103). The server system 300 normally distributes the tweet data to a plurality of terminal devices. For example, the server system 300 distributes the tweet data to the terminal devices of the registered users. Specifically, the process (S104 to S108) performed by the terminal device 200 is performed by each terminal device to which the tweet data has been distributed. Note that the process performed by one terminal device is described below for convenience of explanation.

The terminal device 200 receives the tweet data distributed by the server system 300, and notifies the user of reception of the tweet data (S104). The terminal device 200 may notify the user of reception of the tweet data by outputting a notification sound, or causing an LED to emit light, for example. Alternatively, the terminal device 200 may notify the user of reception of the tweet data using another device. For example, when the terminal device 200 is a camera, and the tweet data has been distributed to the camera, the user may be notified of reception of the tweet data through a smartphone or the like possessed by the user. The smartphone or the like may notify the user of reception of the tweet data by outputting an alarm sound, or utilizing a vibration function, for example. Various other methods may also be used. In this case, the camera may transmit a notification instruction to the smartphone or the like. When the server system 300 stores information about the network address (e.g., email address) or the like of the smartphone possessed by the registered user, the server system 300 may transmit a notification instruction to the smartphone.

The display control section 220 of the terminal device 200 performs the display control process that displays the distributed tweet data on the display section (see FIG. 4) (S105). Note that the display control process in the step S105 may notify the user of reception of the tweet data (see S104). In this case, the display section that has been in a sleep state or displaying another screen displays the tweet data to notify the user of reception of the tweet data.

When the tweet data has been displayed, and the user has performed an imaging operation in response the displayed tweet data, the terminal device 200 acquires the captured image (S106). The terminal device 200 then generates the metadata that is added to the captured image (S107). The metadata may be generated based on the tweet data, or may be generated based on the shooting information. When the tweet data is text data, the entire text data may be used as the metadata, or a word or a clause acquired by performing a parsing process on the text data may be used as the metadata. Examples of the metadata based on the shooting information include time information about the time between timings (e.g., tweet data acquisition timing, notification timing, captured image acquisition timing, or captured image transmit timing), and operation history information about the operation section (e.g., button illustrated in FIG. 4) of the terminal device 200.

The terminal device 200 transmits the acquired captured image and the generated metadata to the server system 300 (S108). In this case, it is desirable to transmit the tweet data corresponding to the image information to the server system 300 in addition to the captured image and the metadata. Specifically, since it is considered that the server system 300 stores a plurality of pieces of tweet data (e.g., previous tweet data), the server system 300 must link the captured image and the tweet data when generating and adding new metadata based on the tweet data, for example.

The server system 300 receives the captured image and the metadata sent from the terminal device 200 (S109), and stores the metadata-added captured image (i.e., the captured image to which the metadata is added) (S110). In this case, the server system 300 may generate and add new metadata.

The flow of the rating process is described below with reference to FIG. 6. The rating process may be started after the server system 300 has distributed the tweet data, and the terminal devices 200-1 to 200-N and the like have sent the captured image corresponding to the tweet data.

The rating process need not necessarily be started after all of the users have captured an image corresponding to given tweet data. For example, when a given user has sent the captured image to the server system 300, the rating process may be performed on the captured image without waiting for other users to transmit the captured image. In this case, since the rating process is preferentially performed on the captured image that has been sent earlier, it is expected that the captured image sent by one user attracts much attention from other users, for example. Therefore, it is possible to prompt the users of the terminal devices 200-1 to 200-N and the like to capture an image.

When the rating process has started, the server system 300 generates a thumbnail image of the captured image that is subjected to the rating process (S201), and distributes the generated thumbnail image to the terminal devices and the like that generate rating information (S202).

Figure 8A:
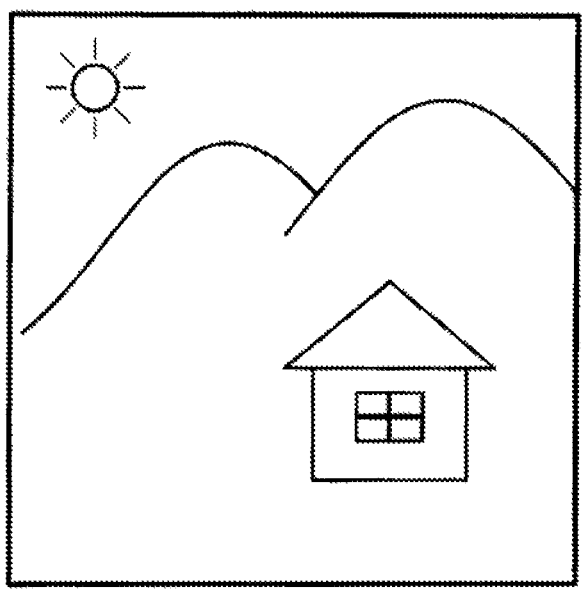
FIGS. 8A to 8C illustrate examples of a captured image and a thumbnail image of a captured image.
Figure 8B:
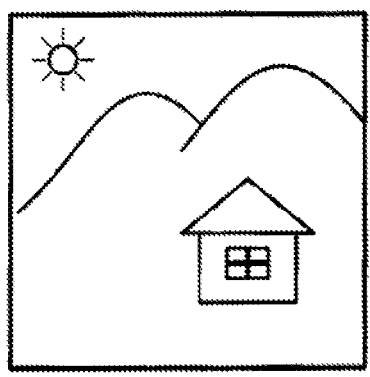
Figure 8C:
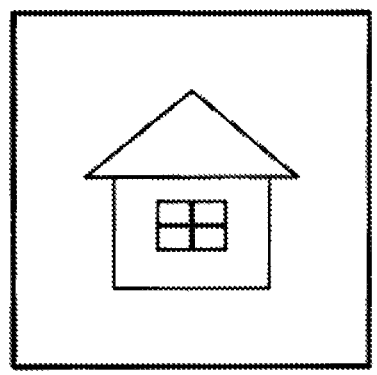

The thumbnail image may be a thumbnail image that is acquired by the method illustrated in FIGS. 8A to 8C. The data size of the information to be sent and received can be reduced, and the communication load on the network 10 can be reduced by distributing a low-resolution thumbnail image instead of the captured image.

Although an example in which the server system 300 transmits the thumbnail image to the terminal device 200 has been described above, the configuration is not limited thereto. For example, the server system 300 may transmit reference information for referring to the captured image (i.e., information that includes the URL corresponding to the captured image or the like). Alternatively, when the user who operates the terminal device 200 knows the website for browsing the captured image, the server system 300 may transmit only text data that states that a new captured image has been posted. Specifically, it suffices that the server system 300 provide the terminal devices 200-1 to 200-N with the captured image information about the captured image. The captured image information may be the thumbnail image, the reference information, text data, or the like. The following description is given on the assumption that the server system 300 transmits the thumbnail image. Note that the thumbnail image may be replaced with another captured image information.

FIG. 6 illustrates an example in which the rating target captured image has been captured and sent by the second terminal device. Accordingly, the thumbnail image is distributed in the step S202 to the terminal devices 200-1 to 200-N excluding the second terminal device. Note that FIG. 6 illustrates the process performed by the first terminal device among the terminal devices 200-1 to 200-N excluding the second terminal device.

The first terminal device receives the thumbnail image from the server system 300 (S203), and transmits the rating information that indicates the rating of the received thumbnail image (S204).

Note that the transmission terminal device 100 that sent the tweet data may also transmit the rating information. Specifically, the server system 300 may also transmit the thumbnail image to the transmission terminal device 100, and the transmission terminal device 100 may receive the thumbnail image (S209), and transmit the rating information (S210).

The server system 300 performs the rating process based on the rating information received from the first terminal device (and other terminal devices (not illustrated in FIG. 6)) and the transmission terminal device 100 (S205).

Figure 9:
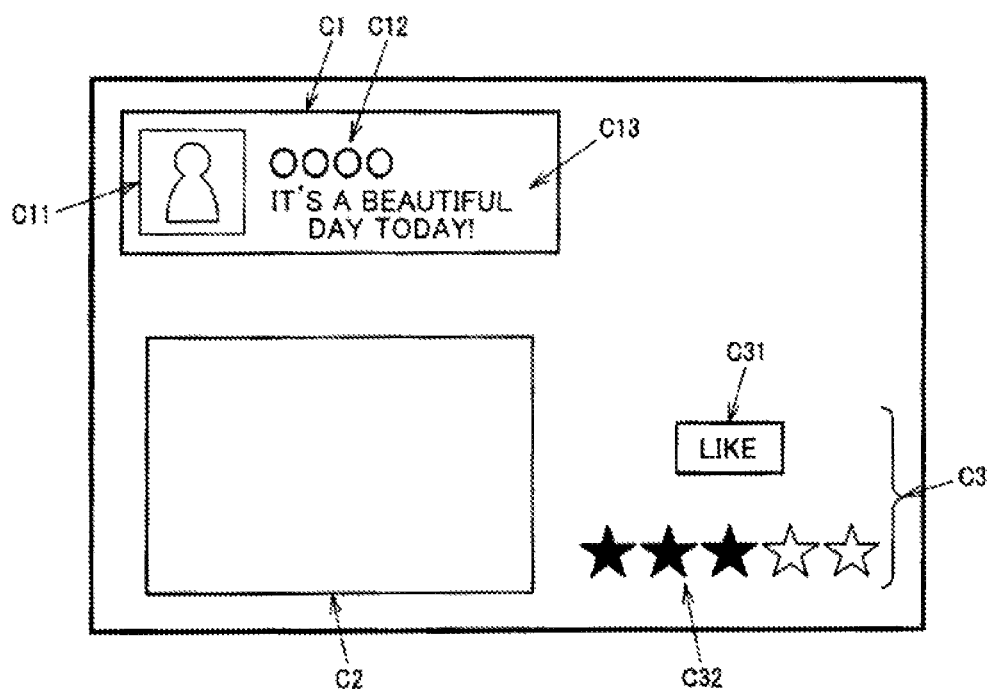
FIG. 9 illustrates an example of a screen displayed on a display section of a terminal device when transmitting rating information.

FIG. 9 illustrates an example of the rating process. FIG. 9 illustrates an example of a screen that is displayed on the terminal device 200 and the like when transmitting the rating information. In the example illustrated in FIG. 9, the tweet data based on which the captured image has been captured is displayed in a display area C1, and the rating target captured image (i.e., the thumbnail image thereof) that has been captured corresponding to the tweet data and distributed by the server system 300 is displayed in a display area C2. The tweet data need not necessarily be displayed. However, it is desirable to display the display area C1 on the screen since the captured image has been captured corresponding to the tweet data, and is rated taking account of the degree of relevance to the tweet data. An icon image C11 that represents the transmitter of the tweet data, a user name C12 of the transmitter, and a text C13 of one tweet data among a plurality of pieces of tweet data that corresponds to the image displayed in the display area C2 are displayed in the display area C1. Note that the configuration is not limited thereto.

In the example illustrated in FIG. 9, the rating information generated by the terminal device 200 is sent to the server system 300 using an area C3. For example, a button that increases the rating of the image displayed in the display area C2 (i.e., the captured image corresponding to the thumbnail image displayed in the display area C2) is provided (see C31). When the button has been pressed, information that indicates that the button has been pressed is sent to the server system 300 as the rating information. In this case, the rating process performed by the server system 300 in the step S205 calculates the total number of times that the rating information indicating that the button (see C31) has been pressed has been received from the terminal devices 200-1 to 200-N (i.e., the terminal devices 200-1 to 200-N excluding the terminal device that sent the captured image displayed in the display area C2). Note that the rating interface is not limited thereto. For example, the operation time corresponding to the rating target image displayed on the display section (e.g., the time in which the area of the displayed rating target image is touched when the display section has a touch panel function) or the like may be measured, and the points may be increased as the operation time or the like increases.

Figure 16:
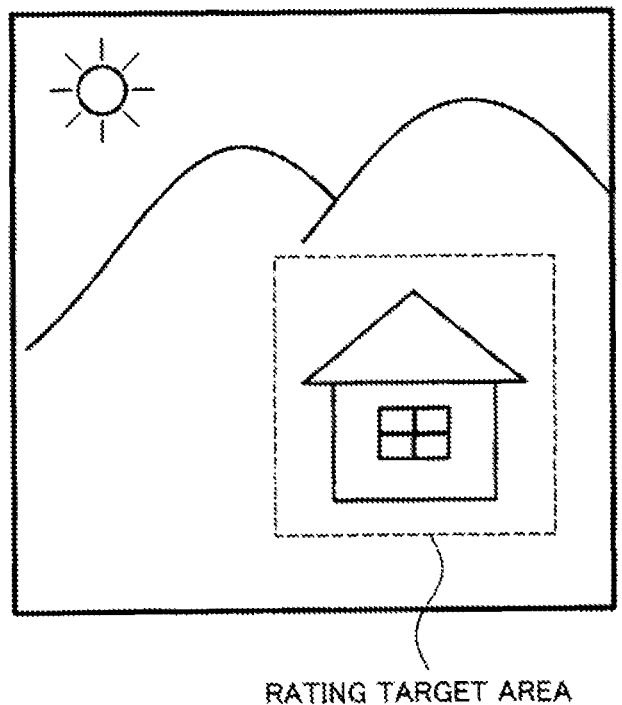
FIG. 16 illustrates an example in which a rating process is performed on part of image information.

Alternatively, an image for selecting the points given to the image displayed in the display area C2 may be displayed (see C32 in FIG. 9), and the points selected using the displayed image may be sent to the server system 300 as the rating information. In the example illustrated in FIG. 9, five stars are displayed, and the color of the Nth star from the left is changed when the Nth star from the left has been selected (e.g., the Nth star from the left has been selected by moving a cursor using a physical button) to notify the user that N points have been selected as the points given to the image. When the user has determined to select the Nth star from the left (e.g., by pressing an OK button (physical button)), the rating information that indicates the N points is sent to the server system 300. In this case, the rating process performed by the server system 300 in the step S205 calculates the sum, the average value, or the like of the points indicated by the rating information sent from the terminal devices 200-1 to 200-N (i.e. the terminal devices 200-1 to 200-N excluding the terminal device that sent the captured image displayed in the display area C2). Note that the details of the rating information and the rating process that utilizes the rating information are not limited thereto. For example, the rating information is not limited to information that can be easily converted into a numerical value, but may be comment information (text data) or the like. Alternatively, part of the image may be rated (see FIG. 16), and the rating result may be used as the rating information.

When the captured image has been highly rated as a result of the rating process, the rating bonus information is sent to the second terminal device that sent the captured image. Specifically, the server system 300 generates the rating bonus information (S206), and transmits the generated rating bonus information to the second terminal device (S207). The second terminal device receives the rating bonus information sent from the server system 300 (S208).

The user of each terminal device may rate only one captured image without seeing another captured image. Note that the user of each terminal device normally sees a plurality of captured images that have been sent corresponding to single social data, and rates the captured image through comparison and the like. Therefore, the thumbnail image transmitting process and the browsing process implemented by the terminal device can be implemented in various ways. Specifically, the server system 300 may transmit the thumbnail image to each terminal device (the terminal device that sent the captured image corresponding to the thumbnail image is excluded) each time the server system 300 has generated the thumbnail image corresponding to given social data, and each terminal device may display the received thumbnail images corresponding to the given social data side by side instead of displaying only the latest received thumbnail image. Alternatively, the server system 300 may generate image information that indicates the thumbnail images that correspond to given social data and are arranged side by side, and transmit the image information to each terminal device, and the user of each terminal device may compare the thumbnail images corresponding to the given social data. The thumbnail image generation/transmitting method implemented by the server system 300 and the thumbnail image browsing method implemented by the terminal device 200 may be modified in various ways.

The rating process need not necessarily performed based on the rating information, but may be performed based on the metadata that is linked to the captured image.

FIG. 17 illustrates specific examples of the metadata. The metadata may be generated based on the tweet data (shooting event start notification information in a broad sense). Specifically the tweet data preparation timing, the tweet data transmit timing, the tweet data preparation position, or the tweet data preparation time may be used as the metadata. When the tweet data is text data, the tweet data (entire text), an extracted word, an extracted word that is weighted based on statistical data (e.g., an extracted word that is selected corresponding to the usage frequency), characters in a given number from the head/end, a character string (e.g., ASCII art or emoticon), or the like may be used as the metadata.

The shooting information acquired when capturing an image may be used as the metadata. As illustrated in FIG. 17, the time elapsed from the tweet data reception timing to the capture timing of the captured image (transmitting target), the number of images captured during the above time, the operation history (e.g., button/lever operation history), the time elapsed from the capture timing of the captured image to the transmitting process, or the like may be used as the metadata. Another information that is normally acquired when capturing an image (e.g., Exif (exchangeable image file format)) may also be used as the metadata. Exif includes information that indicates the manufacturer and the model name of the imaging device, and the imaging conditions such as the shutter speed, the aperture, and the focal length, and the like Information that is not normally used when capturing an image, or information acquired as a result of adding a sensor or the like may also be used as the metadata. It is considered that such information is information about the behavior of the user (hereinafter referred to as "behavioral information"). As illustrated in FIG. 17, the time elapsed from reception of the tweet data to the timing at which the user has viewed the tweet data on the display section, or the shutter half-press time when the user captured the captured image may be used as the metadata. Alternatively, the shooting position, the moving distance between the tweet data acquisition timing and the capture timing, the number of steps, or the like (measured using the GPS or a pedometer) may be used as the metadata.

An example of a specific rating method using each metadata is described below. Note that all of the metadata need not necessarily be used for the rating process. Some of the metadata may not be useful for the rating process.

For example, the rating process may be performed based on how soon (timely) the image was collected after the tweet data preparation timing and the tweet data transmit timing. For example, the tweet data preparation timing and the tweet data transmit timing may be compared with the shooting time included in the shooting information, and the image may be highly rated when the difference in timing is small.

The tweet data preparation position may be compared with the metadata that indicates the shooting position. For example, when the tweet data was prepared in Japan, it is considered that the user who prepared the tweet data is familiar with the image information captured in Japan (i.e., an image of a landscape, a town, an animal, or the like in Japan). On the other hand, since an image captured in a foreign country is rare, the image may be highly rated.

When using the tweet data, the image may be highly rated when the total number of words extracted from the tweet data is small. When the number of words is large, the captured image may relevant with only some of the words, and the accuracy of the remaining words as the metadata is low. When the number of words is small, it is considered that the reliability of each word as a keyword that specifies the characteristics of the captured image is high.

When the word extracted from the tweet data is a current word (e.g., a word that has been widely used in media such as newspapers within several days to several months), or a word that is frequently input on an Internet search site or the like, the image may be highly rated. When the word is weighted based on statistical data (e.g., usage frequency in text representation or conversational expression), the weighting may be used as a score, and the image may be highly rated when the word has a high score (when the word is a composite word synthesized by a plurality of words, at least one of which has a high score).

When characters in a given number from the head/end of the tweet data is used as the metadata, the rating process may be performed based on whether or not the characters include a specific pattern. For example, the thoughts and feelings of the transmitter, the environment where the transmitter is present, and the like may be estimated from a pattern that expresses feelings (e.g., an interjection or inflection) in text representation. When extracting characters in a given number from the head/end of the tweet data, the rating process is performed based on the pattern. For example, when attaching importance to a change in emotion, the image is highly rated when a pattern that expresses an emotion is included in the characters. The rating may be lowered when the characters includes a pattern that contributes to emotional expression or communication to only a small extent (e.g., a pattern typically used at the end of a sentence, or a pattern relating to greeting).

When the tweet data preparation time is long, it is considered that the words and the like included in the tweet data are carefully selected, and it is expected that an image corresponding to the tweet data can be easily captured. Therefore, the image may be highly rated when the tweet data preparation time is long.

The shooting information and the behavioral information may be used as an index that indicates the motivation of the user when the user captured the captured image. Therefore, the image may be highly rated when it is considered that the motivation of the user was high.

Specifically, when the time elapsed from reception of the tweet data to the timing at which the user viewed the tweet data, the time elapsed from reception of the tweet data to the capture timing of the captured image, the time elapsed from the capture timing to the transmitting process, or the like is short, it is considered that the motivation of the user was high, and the image is highly rated.

It is considered that the user carefully selected the composition and the imaging conditions (e.g., focal length, aperture, and ISO speed) when the shutter half-press time when the user captured the captured image, the number of images captured, the operation history and the like are long or large, and the image is highly rated.

It is considered that the user took time to search the object when the moving distance or the number of steps between reception of the tweet data and the capture timing of the captured image is long or large, and the image is highly rated.

The image may be highly rated when the difference between the captured image shooting position and the tweet data preparation position is large. Alternatively, the shooting positions of a plurality of captured images sent corresponding to given tweet data may be compared. For example, when most of the images corresponding to given tweet data were captured in Japan, an image captured in a foreign country is highly rated taking account of rarity.

The rating process based on the metadata may be performed from a viewpoint other than motivation and the like. For example, it is desirable that a larger number of images be collected when creating an image database or the like. Specifically, a large number of images can be collected by capturing an image within a short time, capturing a large number of images, or frequently changing the imaging conditions, for example. Therefore, the shooting time, the shooting count, the operation count, and the like may be used as a rating index.

When creating an image database or the like, it is also important that many types of metadata are provided, and various types of image information are linked to identical metadata. The time elapsed from distribution of the tweet data to the image collection timing may also be used as a rating index, and whether or not the captured image was carefully selected by the user also relates to the rating of the captured image. Since the above metadata may be used for rating from such a viewpoint, the rating process may be performed using various types of metadata from various viewpoints. FIG. 17 illustrates the relationship between the viewpoint of rating and the metadata.

As described above, the rating process can also be performed using the metadata added to the captured image. The rating process that utilizes the metadata differs from the rating process that utilizes the rating information in that the rating information is generated by the user, while the metadata is generated by the system (e.g., generated by the metadata addition section 323 of the server system 300). Specifically, since the rating process that utilizes the rating information is performed based on the information from the user who has observed the captured image (or the thumbnail image), the details of the captured image are rated although the rating may be subjective. Moreover, it is expected that the rating target user is more motivated by the rating determined by each user as compared with the rating determined mechanically.

The rating process based on the metadata determines the rating based on whether or not it is expected that the degree of coincidence of the metadata is high, or whether or not it is expected that the user is highly motivated to capture an image. Therefore, since the system need not analyze the details of the captured image, and information from other users is unnecessary, the rating process can be completed by the system (e.g., server system 300).

The flow of the image set generation process is described below with reference to FIG. 7. FIG. 7 illustrates an example in which the image set information is used for slide show display on the terminal device 200. Note that the configuration is not limited thereto. When the image set generation process has started, the terminal device 200 transmits the captured image information about the captured image (S301), and the server system 300 receives the captured image information (S302). Since the captured image indicated by the captured image information corresponds to a candidate for an image included in the image set, an image (or a candidate thereof) to be included in the image set is designated by transmitting the captured image information.

When the terminal device 200 has sent the slide start instruction information (S303), the server system 300 selects the insertion image (S304), and generates the image set information that indicates the captured image and the insertion image (S305). The server system 300 performs the slide distribution process that determines whether or not each image indicated by the image set information is stored in the terminal device 200, and transmits necessary information to the terminal device 200 (S306). The details of the steps S304 to S306 are described later. Although FIG. 7 illustrates an example in which the captured image information and the slide start instruction information are sent separately, the configuration is not limited thereto. For example, the captured image information that designates the captured image included in the image set information may be sent each time the image set information has been generated without transmitting the slide start instruction information.

A slide show is displayed on the terminal device 200 corresponding to the slide distribution process performed by the server system 300 (S307).

4. Image Set Information Generation Method

The image set information generation method according to one embodiment of the invention is described below.

4.1 Captured Image Information

When generating the image set information, the server system 300 receives the captured image information from the terminal device 200 that is considered to use the image set information. The captured image information refers to information that indicates the captured image acquired (i.e., captured) by the terminal device 200, and may be sent to the server system 300 corresponding to the image set information usage timing (e.g., slide show display execution timing).

Specifically, the terminal device 200 transmits the acquired captured image to the server system 300 in the step S108 in FIG. 5, and transmits information that designates the image among the sent captured images that is used as a candidate for an image included in the image set as the captured image information in the step S301 in FIG. 7.

Figure 10A:
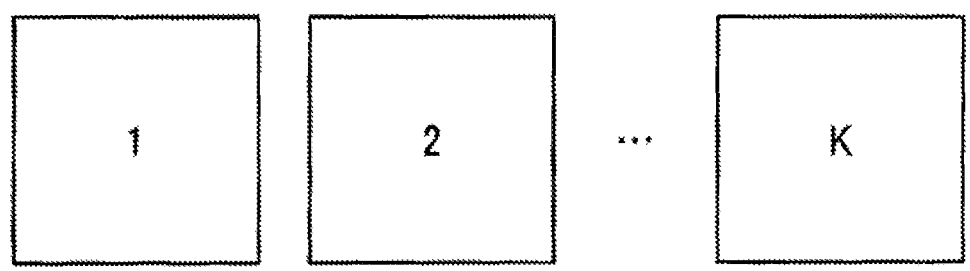
FIGS. 10A to 10C illustrate examples of captured image information.
Figure 10B:
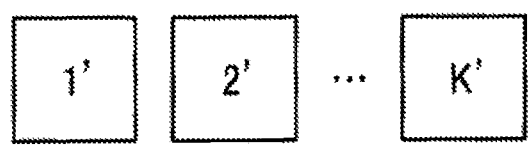
Figure 10C:
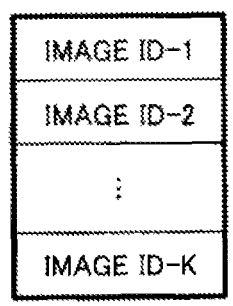

Various types of information may be used as the captured image information. For example, when the terminal device 200 stores the captured image in its storage area, a plurality of captured images 1 to K (or one captured image) may be used as the captured image information (see FIG. 10A). Note that the captured image is sent to the server system 300, and stored in the storage section 325 in the steps S108 to S110 in FIG. 5. Specifically, the thumbnail image of the captured image may be sent (see FIG. 10B) instead of transmitting the captured image taking account of a reduction in network communication load and the like. In FIG. 10B, the thumbnail image of the captured image 1 is a thumbnail image 1', the thumbnail image of the captured image 2 is a thumbnail image 2', and each thumbnail image has been linked to the captured image (original image) (e.g., the metadata that indicates the original captured image has been added). When the terminal device 200 and the server system 300 share information (e.g., image ID) that uniquely specifies the captured image, an image ID set (see FIG. 10C) may be used as the captured image information.

4.2 Selection of Insertion Image and Generation of Image Set Information

When the server system 300 has acquired the captured image information (see FIGS. 10A to 10C), the server system 300 selects the insertion image, and generates the image set information. In one embodiment of the invention, a surprise effect or the like is implemented to improve amusement by inserting an image that is not captured by the user into the image set. The server system 300 selects an image that is stored in the storage section 325 and differs from the captured images indicated by the captured image information as the insertion image. The server system 300 generates a set of a plurality of images in which the insertion image is inserted between the captured images indicated by the captured image information as the image set information. Note that all of the captured images indicated by the captured image information may be included in the image set information, or only some of the captured images indicated by the captured image information may be included in the image set information. The image set information includes information that indicates a set of a plurality of pieces of image information, information that indicates the order of slide show display, information that indicates a list displayed within the display screen, and the like.

Note that the image set information is not limited to a set of the captured images and the insertion image. For example, the image set information may be a set of information that specifies the image included in the image set (see FIG. 10C).

In one embodiment of the invention, the insertion image is selected from a plurality of images stored in the server system 300 based on the metadata added to the captured image indicated by the captured image information. The metadata may be the metadata generated in the step S107 in FIG. 5, or may be the metadata generated by the server system 300, or may be the metadata generated based on the rating information sent to the server system 300 in the step S204 or S210 in FIG. 6.

The insertion image may be selected based on the metadata in various ways. For example, a taste estimation process that estimates the user's taste based on the metadata may be performed, and the insertion image may be selected using the results of the rating process and the results of the taste estimation process. It is considered that the user is more satisfied when the user has acquired the image set when the number of insertion images included in the image set is large, and the insertion image is valuable for the user. Therefore, the number of insertion images may be determined corresponding to the results of the rating process (i.e., the number of insertion images is increased as the rating increases), and the details of the insertion image (e.g., captured object) may be determined corresponding to the results of the taste estimation process.

The taste estimation process is described below. In one embodiment of the invention, a plurality of pieces of tweet data may be distributed to the terminal device 200 of the user. In this case, it is unlikely that each user transmits the captured image corresponding to all of the tweet data. It is considered that each user sets a priority based on criteria, and transmits the captured image corresponding to some of the tweet data with a high priority. The priority may be determined in various ways. It is considered that the user may set the priority based on the taste of the user.

For example, when tweet data that includes the word "dog", tweet data that includes the word "cat", and tweet data that includes the word "bird" have been repeatedly distributed, and the user has frequently sent the captured image corresponding to the tweet data that includes the word "dog", but has not frequently sent the captured image corresponding to the tweet data that includes the word "cat" and the tweet data that includes the word "bird", it is considered that the user likes dogs.

Specifically, the server system 300 can estimate the taste of a given user by statistically analyzing the metadata (based on the tweet data) added to each of a plurality of captured images sent by the given user. For example, when the metadata is a word, the number of captured images to which each word is added may be counted, and the word that is added to a large number of captured images may be estimated to correspond to the taste of the user. Note that the ratio of the number of sent captured images to the total number of pieces of distributed tweet data that includes the word may also be used. Various other methods may be used to estimate the taste of the user who sent the captured image from the captured image to which the metadata was added.

The information about the tweet data transmitter who sent the tweet data is very useful for the taste estimation process. Specifically, when the user of the terminal device 200 has sent the captured image in response to given tweet data, it is considered that the user is interested in the tweet data transmitter. For example, when the tweet data transmitter is a public figure, whether or not the user of the terminal device 200 likes the public figure can be determined. The taste of the user can also be estimated from the attribute of the public figure (e.g., whether the public figure belongs to the classical music business or the pop music business when the public figure is a person in the music business). The taste estimation process based on a public figure may be useful information not only for enhancement of the service for each user (e.g., selection of an appropriate insertion image), but also for marketing research and the like. Specifically, the commercial and economic influence of a public figure changes depending on the popularity. Note that the tweet data transmitter is not limited to a person. For example, the tweet data may be sent in the name of a company or the like. In this case, the company or the like is the tweet data transmitter.

The shooting information and the behavioral information include information that is not considered to be effective for estimating the taste of the user (see FIG. 17). However, the information about the operation history of the imaging device and the like may be used to estimate the taste of the user. For example, an imaging device has been designed to have a mode in which the parameters are automatically set corresponding to the shooting situation (e.g., night view mode, sport mode, and portrait mode). It can be estimated that the user who captured a large number of images in the night view mode likes a night view. The taste of the user relating to the brightness of the image can be estimated from the aperture and the ISO speed, and whether or not the user likes macro shooting can be estimated from the focal length and the like. Specifically, a configuration other than the configuration in which the taste estimation process is performed using the information based on the tweet data may also be employed.

The taste estimation process may also be performed based on the rating information. In this case, the taste of the rating user who transmits the rating information about the captured image is estimated instead of the user who transmits the captured image to be rated. The taste of the user is estimated using the metadata such as "dog" or "cat". Specifically, the metadata added to the captured image for which a given user has sent the rating information that indicates a high rating is analyzed. For example, when the given user frequently awards a high rating to the captured image to which the metadata "dog" is added, it is estimated that the given user likes dogs.

The insertion image may be selected using the results of the taste estimation process. For example, when the user of the terminal device 200 frequently captures a dog as the object, and it is estimated that the user likes dogs, an image to which the metadata "dog" is added may be selected as the insertion image. When providing a service in cooperation with a public figure, an image or the like of the public figure is considered to be valuable for the user. Therefore, an image or the like of the public figure that attracts the user is suitable as the insertion image.

The type of metadata used to select the insertion image, and the insertion image selection method based on the metadata are not limited to those described above. Various modifications and variations may be made.

4.3 Slide Distribution Process

The image set information generated as described above may be used to implement slide show display on the terminal device 200 or the like, for example. The slide distribution process performed by the server system 300 when implementing slide show display on the terminal device 200 is described below.

Figure 11:
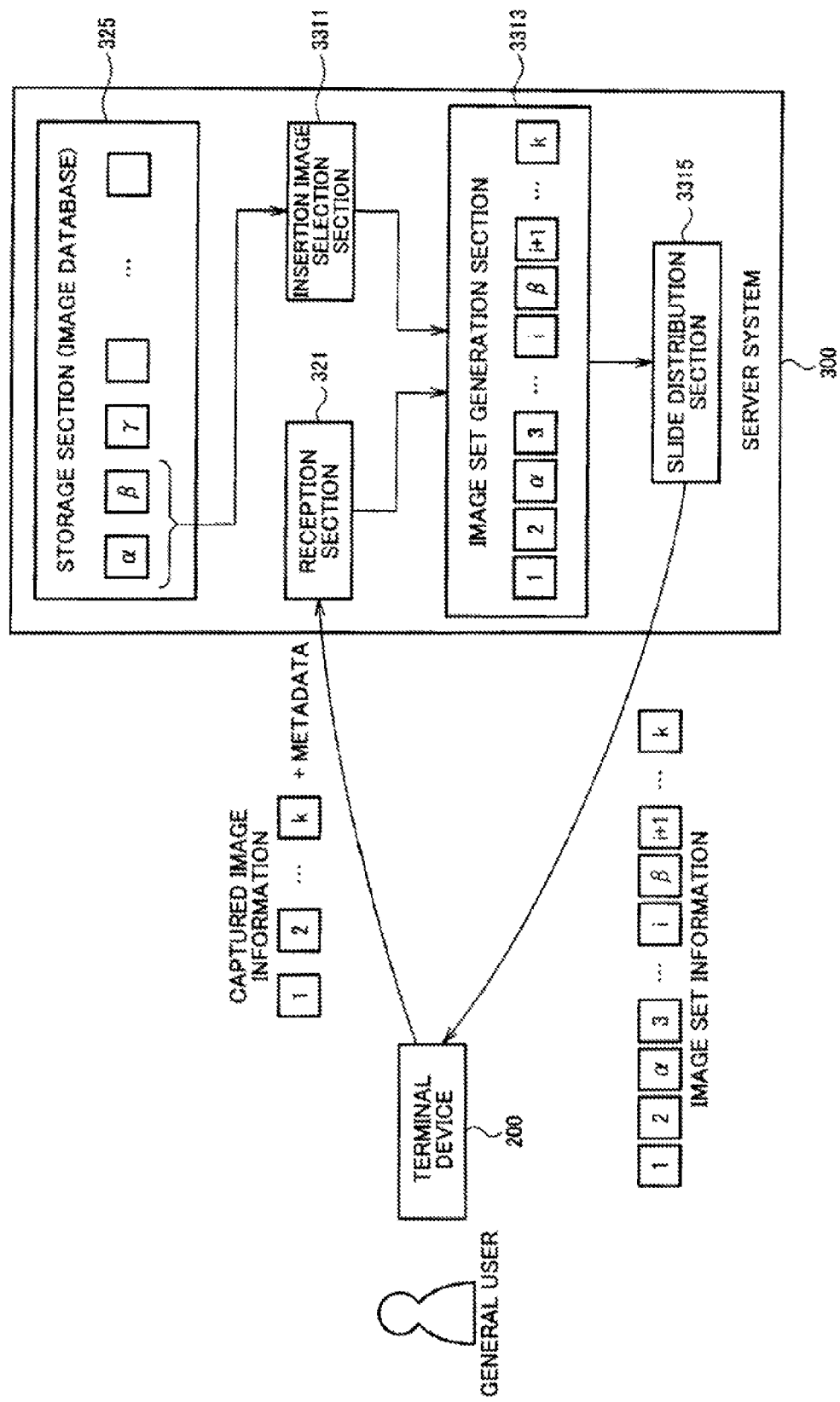
FIG. 11 is a view illustrating a slide distribution process according to one embodiment of the invention.

The image set information may be a set of images used for a slide show. In this case, a process that transmits the image set information to the terminal device 200 is performed as the slide distribution process (see FIG. 11) to implement a slide show. In the example illustrated in FIG. 11, the captured image information that indicates first to kth images and the metadata have been sent by the user, and the insertion image selection section 3311 has selected images (images α and β) that differ from the first to kth images from the storage section 325 as the insertion images. The image set generation section 3313 generates the image set information that includes the first to kth images and the insertion images α and β. In the example illustrated in FIG. 11, the image set generation section 3313 generates the image set information in which the image α is inserted between the second image and the third image, and the image β is inserted between the ith image and the (i+1)th image. Note that the configuration is not limited thereto. the insertion positions of the images α and β, the order of the first to kth images, and the like may be arbitrarily modified. The slide distribution section 3315 performs a process that distributes information that includes the first to kth images, the insertion images α and β, the display order of the first to kth images and the insertion images α and β during a slide show, and the like as the slide distribution process.

Since the captured images were originally acquired using the terminal device 200, the images included in the image set (i.e., the images used for a slide show) may be stored in the storage area of the terminal device 200. For example, since the first to kth images in FIG. 11 were originally captured using the terminal device 200, the first to kth images are stored in the terminal device 200 unless the first to kth images have been deleted. In such a case, it is not advantageous to transmit the captured images from the server system 300 since the communication load on the network 10 increases. Therefore, information that specifies the images included in the image set, and information that indicates the display order during a slide show and the like may be generated as the image set information (see FIG. 10C), and the image set information and necessary images may be sent to the terminal device 200.

Figure 12:
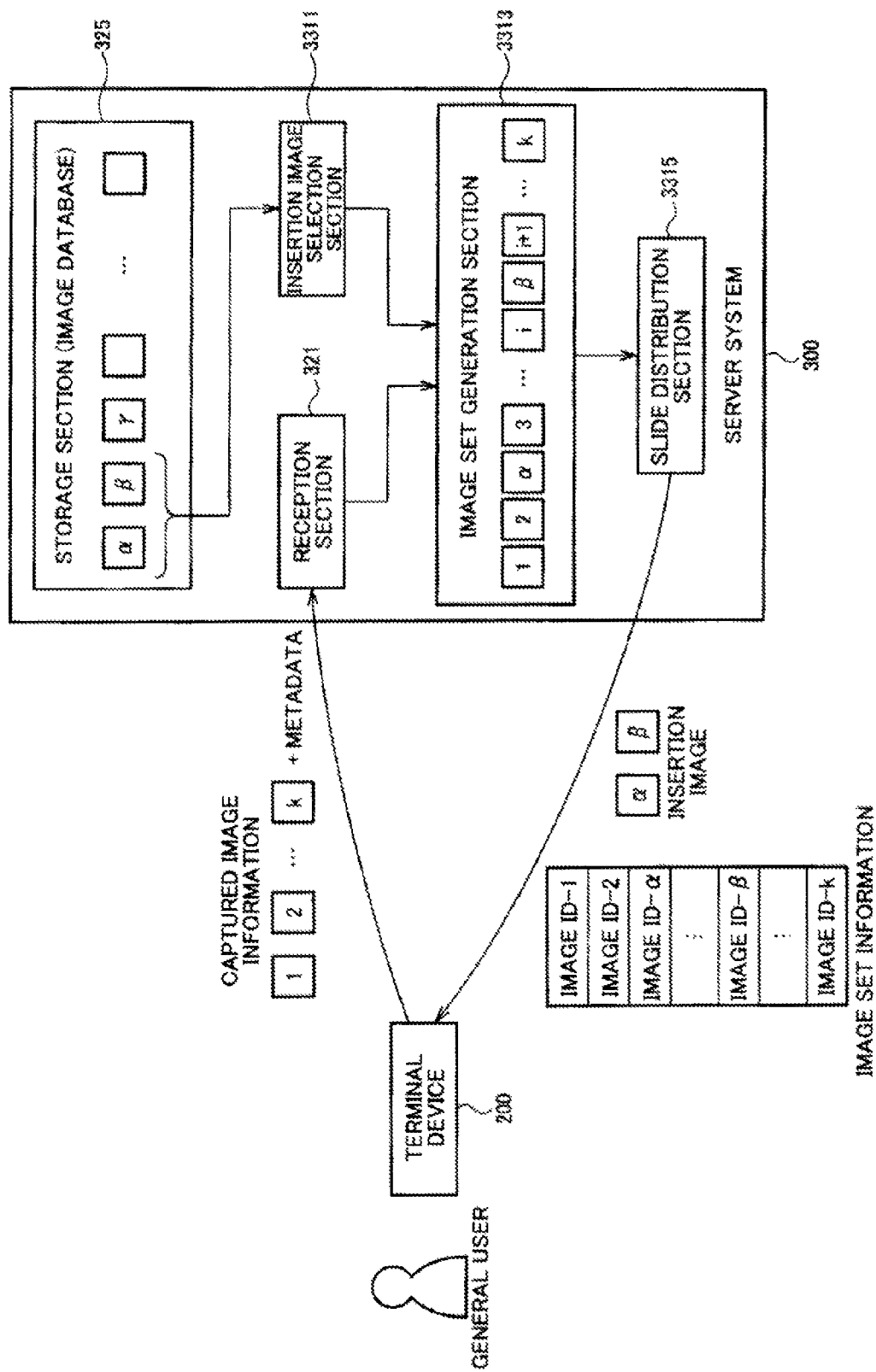
FIG. 12 is another view illustrating a slide distribution process according to one embodiment of the invention.

For example, when all of the captured images indicated by the captured image information are stored in the terminal device 200, the server system 300 may perform a process that transmits the image set information (ID set) and the insertion images as the slide distribution process (see FIG. 12). In the example illustrated in FIG. 12, since the first to kth images are stored in the terminal device 200, only the insertion images α and β are sent to the terminal device 200. Specifically, a process that distributes the insertion images α and β and information that indicates the display order during a slide show is performed as the slide distribution process. Therefore, the communication load on the network 10 can be reduced as compared with the example illustrated in FIG. 11. The terminal device 200 displays a slide show using the received image set information and insertion images and the captured images stored in the terminal device 200.

4.4 Modification

The terminal device 200 may display a high-resolution slide show and a low-resolution slide show. The display section of the terminal device 200 (e.g., the rear liquid crystal display of the imaging device illustrated in FIG. 4) normally has low resolution since the size of the display area and the like are limited. Therefore, when displaying a slide show on the display section of the terminal device 200, it may be unnecessary to use the high-resolution captured images, and it may suffice to use the thumbnail images of the captured images. The terminal device 200 is normally designed so that an image and the like can be output to an external device. Therefore, a slide show may be displayed on a TV or the like by connecting the terminal device 200 to a high-resolution display such as a TV. In this case, the resolution of the thumbnail image is insufficient for a slide show, and it is desirable to display a slide show using the captured image. Specifically, the image set information corresponding to the images having appropriate resolution may be generated corresponding to the situation of a slide show.

5. Example of Service that Utilizes the Above Method

An example of a service that utilizes the terminal device 200 and the like is described below. Note that the terminal device 200 and the like may also be used for an arbitrary service other than the service described below, and may be used in various ways.

5.1 Setting of tweet data transmitter and service user

In one embodiment of the invention, the image information acquired by the terminal device 200 based on the shooting event start notification information (distribution of tweet data) is stored in the server system 300. In this case, a large amount of image information to which various types of accurate metadata are added can be acquired by reliably linking the tweet data and the image information, and adding the metadata based on the tweet data to the image information.

Since the tweet data is communication data that is sent on an SNS, a diversity of metadata can be generated based on the tweet data. However, the accuracy of the metadata and the amount of image information to which the metadata is added vary depending on the motivation of the user and the like. Specifically, since the user must select the object and the like when the user captures an image corresponding to the theme (i.e., tweet data), the user may capture an image that does not sufficiently correspond to the theme, or may not capture an image when the user is not sufficiently motivated.

Therefore, it is desirable that to provide a service that motivates the service user to capture an image. For example, a public figure may be selected as the tweet data transmitter, and the service may be provided to fans of the public figure and the like. Since a fan of a public figure is highly interested in the public figure, it is expected that he or she is highly motivated to capture an image.

It is possible to further motivate the user by employing a rating system for rating images uploaded to the server system. For example, a bonus may be awarded to the user who captured an image having a high rating. It is desirable to provide a bonus relating to a public figure. For example, it is possible to motivate the user by awarding a photograph of an idol (public figure), a sound file of a message from an idol, and the like that are valuable for his/her fans. In particular, it is possible to effectively increase the number of service users by awarding a rare image and the like that cannot be seen in other media (e.g., magazines and other Internet sites). When the service can provide its unique bonus, utilization of the service may be limited. For example, utilization of the service may be limited by requiring user registration, or allowing only a user who has made a given preparation (e.g., only a user who has purchased a dedicated terminal device) to utilize the service. This makes it possible to increase the value of the bonus, and further motivate the user. Since it is likely that a user who is not highly motivated does not upload an image when utilization of the service may be limited, the degree of relevance between the tweet data and the image (i.e., the accuracy of the metadata) can be improved.

It is also possible to employ a rating system in which a public figure rates an image (selects a favorite image). In this case, it is considered that such a rating system remarkably motivates the service user.

The rating system may also be used to determine the accuracy of the metadata, for example. Specifically, since it is considered that the captured image is also rated based on whether or not the captured image corresponds to the tweet data, it is determined that the reliability of the metadata is high when the image has a high rating.

The details of the service are described below taking an example in which the tweet data of a public figure is distributed, and an image is acquired from the service user (e.g., a fan of the public figure). Note that the tweet data transmitter and the service user are not limited thereto as long as it is expected that the service user posts an image in response to the distributed tweet data.

5.2 Image Uploading Phase

Figure 13:
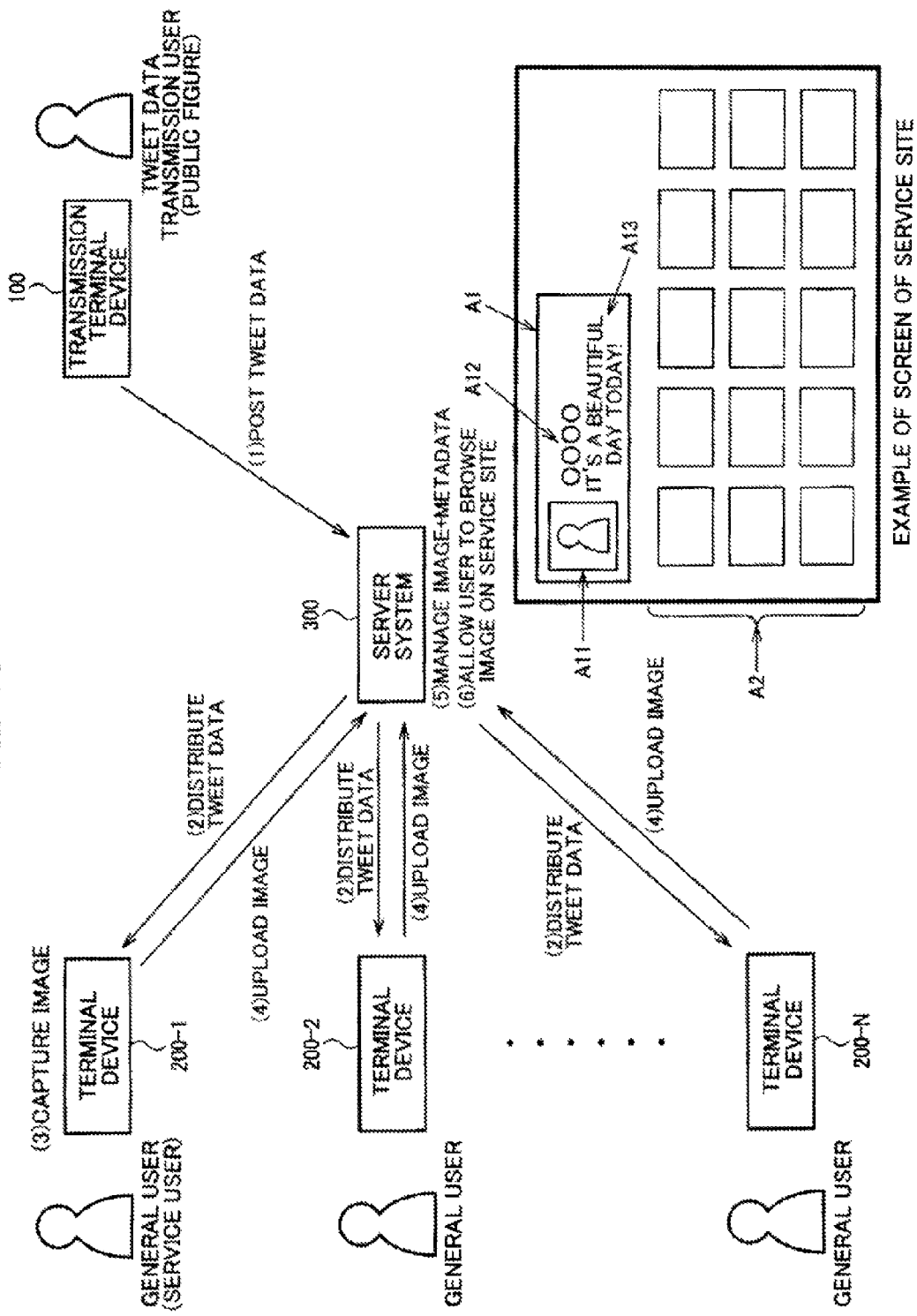
FIG. 13 is a view illustrating an example of a service that utilizes a terminal device and the like according to one embodiment of the invention.

A phase up to an image uploading process is described below with reference to FIG. 13. As illustrated in FIG. 13, the process implemented by the service starts when a public figure has posted the tweet data ((1) in FIG. 13). The server system 300 distributes the tweet data posted by the public figure to the terminal device of each service user ((2) in FIG. 13).

A general user (i.e., service user) captures an image (image information) that is considered to coincide with the distributed tweet data ((3) in FIG. 13), and uploads the captured image to the server system 300 ((4) in FIG. 13).

The server system 300 links the metadata to the uploaded captured image, and stores the captured image ((5) in FIG. 13). The metadata may be acquired from the tweet data, or may be the imaging (shooting) information (e.g. imaging (shooting) time and operation history) acquired until the captured image was obtained.

The server system 300 then allows each service user to browse the image uploaded by each service user on a service site (e.g., website) or the like available for each service user ((6) in FIG. 13). When the terminal device (e.g., 200-1) of the service user has a communication function, the service site may be accessed by the terminal device. Alternatively, the service site may be accessed by a device (e.g., PC) differing from the terminal device. When limiting utilization of the service, access to the service site by an unregistered user may be limited.

FIG. 13 illustrates an example of the service site. In FIG. 13, A1 indicates the tweet data sent by the public figure, and A2 indicates the images posted by the service users corresponding to the tweet data.

5.3 Rating Phase

A phase in which the images (image information) posted by the service users (see the example of the screen of the service site in FIG. 13) are rated is described below with reference to FIG. 14.

Figure 14:
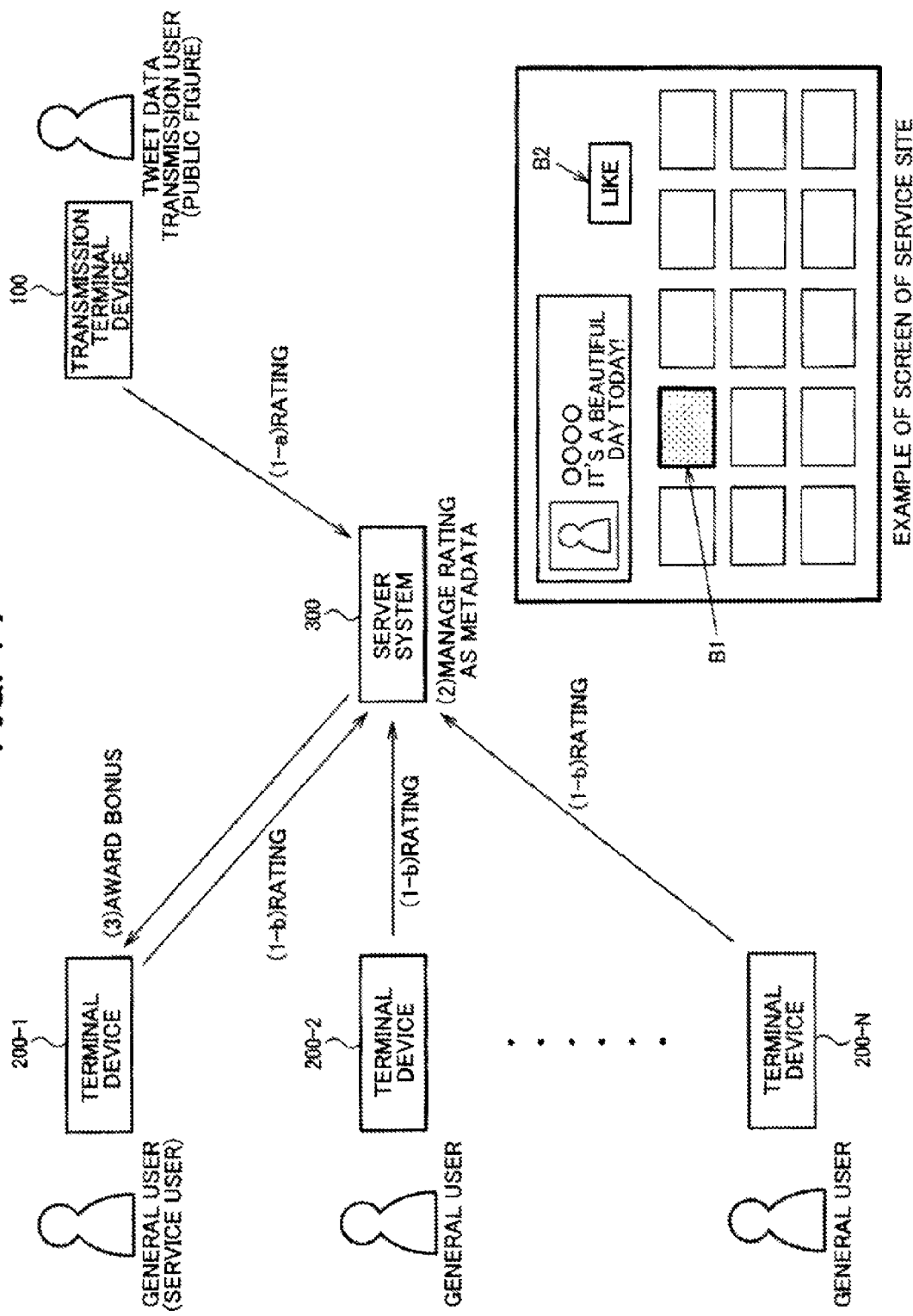
FIG. 14 is another view illustrating an example of a service that utilizes a terminal device and the like according to one embodiment of the invention.

In the example illustrated in FIG. 14, the image information is rated by the public figure ((1-a) in FIG. 14) and the general users ((1-b) in FIG. 14). As illustrated in FIG. 14, one or more pieces of image information are selected from the posted image information (e.g., the selected image is enclosed by a heavy line (see B1)), and the user rates the selected image information by pressing or not pressing a button indicated by B2.

Since the rating information can be used as an index for determining the degree of coincidence between the image information and the tweet data, the rating information may be used as the metadata that is added to the image ((2) in FIG. 14).

A bonus is awarded to the service user who posted the image information having a high rating in order to motivate the service user to capture an image ((3) in FIG. 14).

Since it is considered that the service users are highly interested in the rating by the public figure, it is desirable to attach importance to the rating by the public figure. For example, a rare bonus may be awarded to the service user who posted the image information to which a high rating has been awarded by the public figure regardless of the ratings by the general users. Alternatively, the image information to which a high rating has been awarded by the public figure may be differentiated from other image information by enlarging the image information on the service site, and adding comments from the public figure, for example.

5.4 Image Set Generation/Transmitting Phase

The image set generated by the server system 300 may be sent in order to improve the amusement value of the service, and further motivate the service user to capture an image, for example. This process is described below with reference to FIG. 15.

Figure 15:
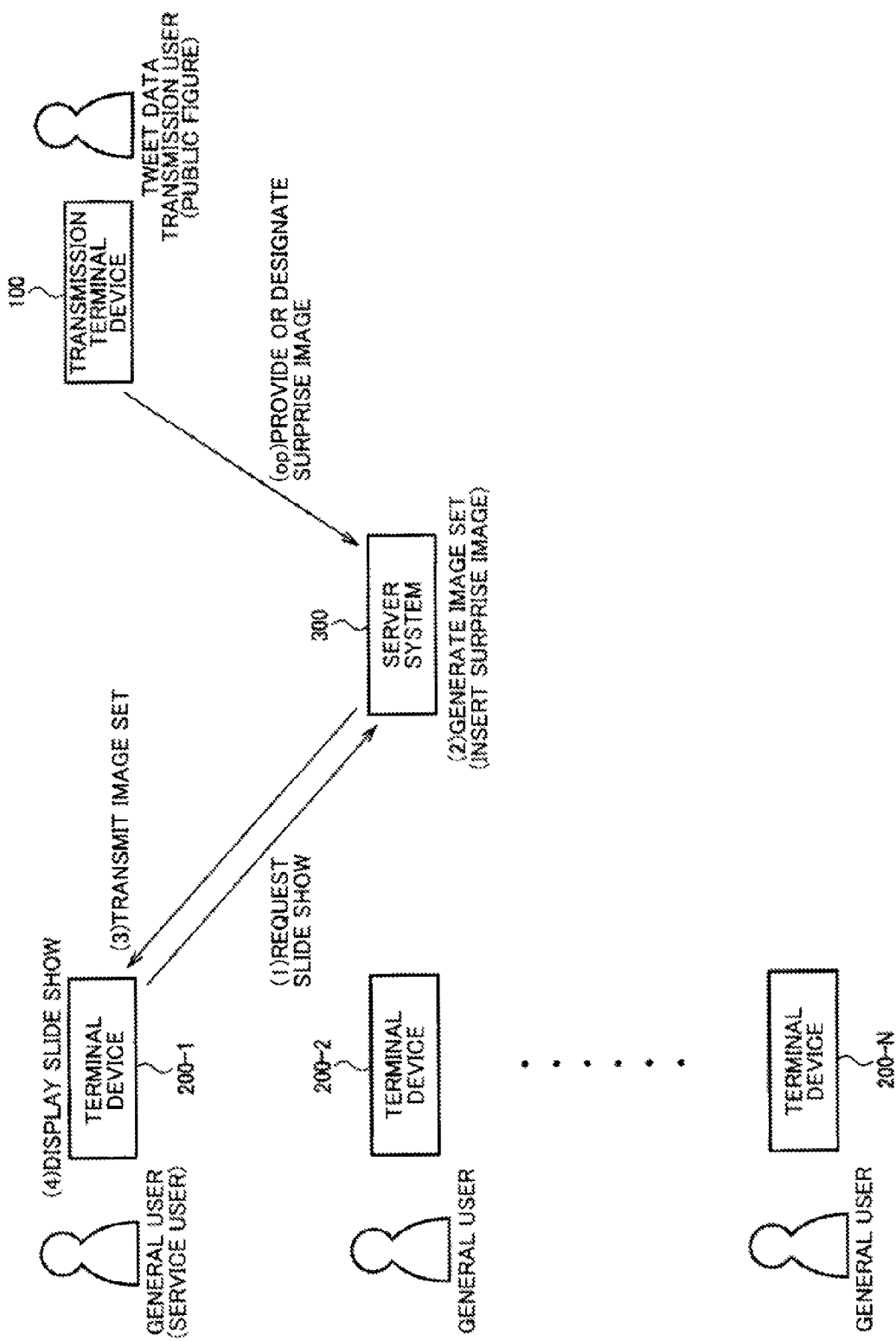
FIG. 15 is yet another view illustrating an example of a service that utilizes a terminal device and the like according to one embodiment of the invention.

When request information for slide show display has been sent from the user ((1) in FIG. 15), the server system 300 generates the image set ((2) in FIG. 15), and transmits the generated image set to the terminal device 200 that sent the request information ((3) in FIG. 15). The terminal device 200 displays a slide show using the received image set ((4) in FIG. 15).

The image set includes an image that is not possessed by the service user who requested slide show display. The service user normally possesses only the image information (thumbnail image thereof in a narrow sense) captured by the service user and the acquired bonus image (in the case where the user is highly rated), and the diversity of the image information is low. Therefore, the server system 300 generates the image set that includes the image information possessed by the service user, and the insertion image that is not possessed by the service user. When such an image set is used for slide show display, the service user can also browse the insertion image that is not possessed by the service user. Therefore, the service user can enjoy slide show display. In particular, a surprise effect can be achieved since the service user is not notified of the details of the insertion image in advance.

The insertion image may or may not be used as a bonus. For example, when it suffices to surprise the user who browses a slide show, an image that is not possessed by the service user may be merely used as the insertion image. When it is also desired to motivate the user to capture an image, it is more effective to select an image that is valuable for the user in the same manner as the bonus image (rating bonus information). In this case, the rating bonus information and the insertion image can similarly motivate the user although the rating bonus information and the insertion image differ in that the rating bonus information is awarded based on the results of the rating process (i.e., when the captured image is highly rated), while the insertion image is presented as part of the image set when displaying a slide show (i.e., the insertion image is independent to of the results of the rating process).

A rare image relating to the public figure (corresponding to the bonus image) may be used as the insertion image. In this case, the user can see a rare bonus image that cannot be seen unless the user posts the image information, and is awarded a high rating. It is possible to make the service more amusing by controlling the probability that a rare image is selected as the insertion image, the details of the rare image to be selected, and the like. This makes it possible to motivate the user to utilize the service and capture an image, and the accuracy of the image information (i.e., the accuracy of the metadata) can be improved while increasing the amount of image information posted.

The insertion image (surprise image) may be an image provided by the public figure ((op) in FIG. 15). An added value can be provided to the insertion image by allowing the public figure to select an image used as the insertion image.

In the example illustrated in FIG. 15, the generated image set is sent to the terminal device, and a slide show is displayed on the terminal device or a device (e.g., a TV that includes a high-resolution display section) connected to the terminal device. Note that the configuration is not limited thereto.

6. Detailed Example of Terminal Device and the Like

According to the above embodiments, the server system 300 includes the reception section 321 that receives the captured image information and the metadata from the terminal device (200-1 to 200-N) connected to the server system 300 through the network 10, the captured image information being information about the captured image captured using the terminal device, and the metadata being added to the captured image, the insertion image selection section 3311 that selects the insertion image differing from the acquired captured image based on the received metadata, and the image set generation section 3313 that generates the image set information in which the insertion image is inserted into the captured image information (see FIG. 3).

The term "captured image information" used herein refers to information that specifies the captured image (or a candidate) included in the image set information. The captured image information is implemented in various ways as described above with reference to FIGS. 10A to 100C. The term "image set information" used herein refers to information that indicates an image set that is a set of a plurality of images. The image set information may include information that specifies the images included in the image set, information that indicates the display order of the images, information that indicates the arrangement of the images on the display screen, and the like. The information that is included in the image set information and specifies the images may be implemented in various ways as described above with reference to FIGS. 10A to 10C in the same manner as the captured image information.

According to the above configuration, it is possible to acquire the captured image information (based on which the image set information is generated) from the terminal device 200, and generate the image set information that includes the insertion image differing from the captured image specified by the captured image information. This makes it possible to generate a diversity of image set information that includes an image that is not stored in the terminal device 200. Since the process (e.g., slide show display) that utilizes the image set information allows the user of the terminal device 200 to browse an unexpected image, it is possible to implement an amusing process (e.g., surprise effect). Although an example of slide show display has been mainly described above as usage of the image set information, the image set information may also be used in various other ways. For example, an album using a paper medium may be produced according to the image set information generated by the server system 300, and provided to the user of the terminal device 200.

The server system 300 may include a transmission section (tweet data transmission section 313 in a narrow sense) that transmits the shooting event start notification information sent from the transmission terminal device 100 to the terminal device 200, and the reception section 321 may receive information about the captured image captured using the terminal device 200 corresponding to the shooting event start notification information as the captured image information.

According to the above configuration, the shooting event can be started by distributing the start notification information from the server system 300, and the captured image captured during the shooting event can be acquired. The shooting conditions may or may not be set for the shooting event. It is considered that some theme (e.g., capture target object) is specified in order to prompt the system user (the user of the terminal device 200) to transmit the captured image. In this case, the start notification information is information that specifies the theme, and the captured images corresponding to the start notification information are images corresponding to an identical theme. Specifically, it is possible to collect a large number of images corresponding to an identical theme, and effectively utilize the image information (e.g., constmect an image database) by distributing the start notification information to a plurality of terminal devices, and acquiring the captured image from the terminal devices. It is possible to effectively motivate the user to capture an image by utilizing the image set information that achieves a surprise effect and the like and the start notification information in combination.

The insertion image selection section 3311 may select an image relating to a start notification transmission user who sent the start notification information using the transmission terminal device 100 as the insertion image.

This makes it possible to use an image relating to the start notification transmission user as the insertion image. For example, when the start notification transmission user is a public figure, it is considered that a person who set the theme for the shooting event plays an important role during the shooting event. In this case, since it is considered that the information about the start notification transmission user is valuable for the user who participates in the shooting event, it is possible to motivate the user by utilizing an image relating to the start notification transmission user as the insertion image.

The transmission section may transmit social data sent from the transmission terminal device 100 on a social networking service as the shooting event start notification information.

The social data may be tweet data. The terms "social data" and "tweet data" used herein have been described above. Therefore, detailed description thereof is omitted. The insertion image selection section 3311 may select the insertion image based on the social data sent from the transmission terminal device 100 as the metadata.

This makes it possible to use the social data as the shooting event start notification information. Since the degree of freedom of the social data is high, a diversity of metadata can be generated based on the social data. Since the social data is mainly used for communication on a social networking service (SNS), it is expected that the image information is normally acquired (i.e. an image is capture using the imaging device) by distributing the social data to prompt the user to capture an image. For example, since it is considered that a person who is close to the social data transmitter, a fan of the social data transmitter, and the like capture an image in order to communicate with the social data transmitter, the server system 300 can collect a large number of images. When the captured image is acquired based on the social data, it is considered that the social data is useful information as the metadata (i.e., information about the captured image). Therefore, the insertion image can be appropriately selected by utilizing the social data as the metadata, for example.

The insertion image selection section 3311 may select the insertion image based on the rating information about the captured image sent from the transmission terminal device 100 as the metadata.

This makes it possible to select the insertion image using the rating information sent by the transmitter of the start notification information (tweet data in a narrow sense). Since the rating information indicates the rating by the transmitter of the start notification information that corresponds to the theme of the shooting event, the insertion image can be effectively selected by utilizing a method that differentiates the rating information from other pieces of metadata (e.g., a method that attaches importance to the rating information as compared with other pieces of metadata), for example.

The reception section 321 may receive the captured image to which the metadata is added, the metadata being generated based on at least one of the shooting information, the behavioral information, and the social data, the shooting information being information about shooting using the terminal device 200 before or after reception of the social data, and the behavioral information being information about the behavior of the user of the terminal device 200 before or after reception of the social data, and the insertion image selection section 3311 may select the insertion image based on the metadata.

This makes it possible to select the insertion image using the metadata generated based on the social data, the shooting information, and/or the behavioral information. The definitions and specific examples of the social data, the shooting information, and the behavioral information are the same as described above. Therefore, detailed description thereof is omitted.

The server system 300 may include a taste estimation section that performs the taste estimation process that estimates the taste of the user of the terminal device 200 based on the start notification information that corresponds to the captured image when the captured image has been sent from the terminal device 200 in response to distribution of the start notification information.

The server system 300 may include a taste estimation section that performs the taste estimation process that estimates the taste of the user of the terminal device 200 based on the start notification information that corresponds to the captured image when the captured image has been sent from the terminal device 200 in response to distribution of the start notification information, and the taste estimation section may perform the taste estimation process based on information about the start notification transmission user who sent the start notification information using the transmission terminal device 100.

The insertion image selection section 3311 may select the insertion image based on the results of the taste estimation process performed by the taste estimation section.

According to the above configuration, since the taste of the user can be estimated, an image that is valuable for the user can be selected as the insertion image, and it is possible to effectively motivate the user to capture an image by distributing the image set that includes the insertion image, for example. In particular, since it is considered that the user subjected to the taste estimation process is highly interested in the start notification transmission user, it is very advantageous to use an image relating to the start notification transmission user as the insertion image. Note that the process that utilizes the results of the taste estimation process is not limited to selection of the insertion image. The results of the taste estimation process may be utilized in a process that creates a user group, a process that transmits information about the results of the taste estimation process including the user group to the outside, or the like.

When the reception section 321 has received information about a first captured image that has been captured using a first terminal device (one of the terminal devices 200-1 to 200-N) as the captured image information, the insertion image selection section 3311 may select the insertion image based on rating information about the first captured image sent from second to Nth (N is an integer equal to or larger than 2) terminal devices that differ from the first terminal device as the metadata.

This makes it possible to select the insertion image using the rating information used for rating among the users as the metadata. For example, when a valuable image is selected as the insertion image when the rating indicated by the rating information is high, it is possible to motivate the user to capture and transmit an image that is expected to be awarded a high rating in combination with utilization of the image set information. This makes it possible to increase the number of images stored in the server system 300, and improve the accuracy of the metadata that is added to the image, for example.

The reception section 321 may receive request information for the image set information issued by the user of the terminal device 200 from the terminal device 200, and the image set generation section 3313 may generate the image set information in response to the reception of the request information.

According to the above configuration, the server system 300 can generate the image set information based on an explicit request from the user of the terminal device 200. In this case, since the image set information can be generated on demand, it is possible to suppress a situation in which the image set information is generated unnecessarily. Note that the image set information need not be generated based on the request information. The server system 300 may subjectively generate and transmit the image set information. For example, when distributing an advertisement to the user as part of the functions of the service, the image set information may be generated without waiting for the user to issue a request. It is considered that the user does not view an advertisement when only an advertisement is distributed. However, when a valuable image is selected as the insertion image, it is expected that the user also views an advertisement. In this case, the method according to the embodiments of the invention can achieve an advantageous effect.

The reception section 321 may receive slide start instruction information that requests the start of slide show display on the terminal device 200 as the request information, and the image set generation section 3313 may generate the image set information in response to the reception of the slide start instruction information.

According to the above configuration, the image set information can be generated based on slide start instruction information sent from the terminal device 200 when the image set information is used for slide show display on the terminal device 200. Since at least part of the display section (i.e., the display section of the terminal device 200 or an external display) is used for slide show display, and the resources of the terminal device 200 are used for slide show display, execution of other processes is limited during slide show display. Therefore, it is preferable that the image set information be generated and sent when the terminal device 200 is not busy. It is possible to efficiently suppress a situation in which an unnecessary process is performed by generating the image set information based on the information sent from the terminal device 200. Although the server system 300 may subjectively generate and transmit the image set information, it is desirable to notify the user that the image set information is to be sent (in order to prompt the user to stop the process performed by the terminal device 200) when the image set information is used for slide show display. For example, the server system 300 may notify the user of the transmitting time of the image set information.

The server system 300 may include the slide distribution section 3315 that performs the slide distribution process, the slide distribution process being a process that distributes the image set information for the slide show display on the terminal device 200 to the terminal device 200. The slide distribution section 3315 may perform the slide distribution process on the image set information generated by the image set generation section 3313 in response to the reception of the slide start instruction information by the reception section 321.

This makes it possible to perform the slide distribution process when implementing slide show display. The slide distribution process may include a process that transmits the image set information, and a process that determines necessary information, transmits the information determined to be necessary, and does not transmit the information determined to be unnecessary. For example, it is not advantageous to transmit an image already stored in the terminal device 200 from the server system 300, and the communication load on the network 10 increases when transmitting an image already stored in the terminal device 200 from the server system 300. Therefore, the insertion image and information that indicates the order of images during slide show display (included in the image set information) may be selectively sent to the terminal device 200 as information necessary for slide show display, and the captured image already stored in the terminal device 200 may not be sent to the terminal device 200. When the captured image has been deleted from the terminal device 200, it may then be necessary to transmit the deleted captured image from the server system 300.

The slide distribution section 3315 may perform a process that distributes a low-resolution insertion image as the slide distribution process when the reception section 321 has received request information for low-resolution slide show display as the slide start instruction information. The slide distribution section 3315 may perform a process that distributes a high-resolution image corresponding to the captured image information and a high-resolution insertion image as the slide distribution process when the reception section 321 has received request information for high-resolution slide show display as the slide start instruction information, the high-resolution slide show display displaying an image having a resolution higher than that of an image displayed during the low-resolution slide show display.

This makes it possible to appropriately utilize low-resolution slide show display and high-resolution slide show display. Since the size of the display section of the terminal device 200 is normally limited (see FIG. 4), low-resolution slide show display may be performed when the slide show is displayed on the terminal device 200. On the other hand, it is desirable to perform high-resolution slide show display when outputting the image information to a high-resolution display such as a TV The embodiments of the invention may be applied to the terminal device 200 that includes the image acquisition section 230 that acquires a captured image, the transmission section 250 that transmits the captured image to which the metadata is added to the server system 300, the reception section 210 that receives information from the server system 300, and the display control section 220 that controls slide show display on a display section. The transmission section 250 transmits request information for the slide show display to the server system 300 by transmitting the captured image information that is information about a plurality of captured images, the reception section 210 receives the insertion image sent from the server system 300 in response to the request information, and the display control section 220 controls the slide show display of the image set that includes the plurality of captured images specified by the captured image information and the insertion image.

The reception section 210 of the terminal device 200 may receive the shooting event start notification information from the server system 300, and the image acquisition section 230 may acquire the captured image corresponding to the received start notification information.

The above configuration makes it possible to implement the terminal device 200 that cooperates with the server system 300, and displays a slide show that utilizes the image set information. The advantages obtained by utilizing the image set information and the like are the same described above in connection with the server system 300. Therefore, detailed description thereof is omitted.

Part or most of the processes performed by the terminal device (e.g., terminal device 200-1), the server system 300, and the like according to the embodiments of the invention may be implemented by a program. In this case, the terminal device, the server system 300, and the like according to the embodiments of the invention are implemented by causing a processor (e.g., CPU) to execute the program. Specifically, a program stored in an information storage device is read from the information storage device, and a processor (e.g. CPU) executes the program read from the information storage device. The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the embodiments of the invention based on a program (data) stored in the information storage device. Specifically, a program that causes a computer (i.e., a device including an operation section, a processing section, a storage section, and an output section) to function as each section according to the embodiments of the invention (i.e., a program that causes a computer to execute the process implemented by each section) is stored in the information storage device.

The server system and the like according to the embodiments of the invention may include a processor and a memory. The processor may be a central processing unit (CPU), for example. Note that the processor is not limited to a CPU. Various types of processors such as a graphics processing unit (GPU) and a digital signal processor (DSP) may also be used. The processor may be a hardware circuit such as an ASIC. The memory stores a computer-readable instruction. Each section of the server system and the like according to the embodiments of the invention is implemented by causing the processor to execute the instruction. The memory may be a semiconductor memory (e.g., SRAM or DRAM), a register, a hard disk, or the like. The instruction may be an instruction included in an instruction set of a program, or may be an instruction that causes a hardware circuit of the processor to operate.

Although only some embodiments of the invention have been described in detail above, those skilled in the art will readily appreciate that many modifications are possible in the embodiments without materially departing from the novel teachings and advantages of the invention. Accordingly, all such modifications are intended to be included within the scope of the invention. Any term cited with a different term having a broader meaning or the same meaning at least once in the specification and the drawings can be replaced by the different term in any place in the specification and the drawings. The configuration and the operation of the terminal device and the server system are not limited to those described in connection with the above embodiments. Various modifications and variations may be made of those described in connection with the above embodiments.

What is claimed is:

1. A terminal device comprising:
an image acquisition section that acquires a captured image;
a transmission section that transmits the captured image to a server system, metadata being added to the captured image;
a reception section that receives information from the server system; and
a display control section that controls slide show display on a display section,
the transmission section transmitting request information with transmitting captured image information that is information about a plurality of the captured images for the slide show display to the server system, the captured image being a candidate for an image included in an image set to be displayed in the slide show display,
the reception section receiving an insertion image that has been selected by the server system, and not captured by the image acquisition section, from images stored in the server system based on the transmitted captured image information, the insertion image to be included in the image set generated and sent from the server system in response to the request information, and
the display control section controlling the slide show display of the image set that includes the insertion image selected by the server system and the captured image acquired by the image acquisition section.

2. The terminal device as defined in claim 1,
the reception section receiving shooting event start notification information from the server system, and
the image acquisition section acquiring the captured image corresponding to the received shooting event start notification information.

3. An information storage device storing a program, the program causing a computer to function as:
an image acquisition section that acquires a captured image;
a transmission section that transmits the captured image to a server system, metadata being added to the captured image;
a reception section that receives information from the server system; and
a display control section that controls slide show display on a display section,
the transmission section transmitting request information with transmitting captured image information that is information about a plurality of the captured images for the slide show display to the server system, the captured image being a candidate for an image included in an image set to be displayed in the slide show display,
the reception section receiving an insertion image that has been selected by the server system, and not captured by the image acquisition system, from images stored in the server system based on the transmitted captured image information, the insertion image to be included in the image set generated and sent from the server system in response to the request information, and
the display control section controlling the slide show display of the image set that includes the insertion image selected by the server system and the captured image acquired by the image acquisition section.

4. A method for controlling a terminal device comprising:
performing an image acquisition process that acquires a captured image;
performing a transmitting process that transmits the captured image to a server system, metadata being added to the captured image;
performing a reception process that receives information from the server system; and
performing a display control process that controls slide show display on a display section,
the transmitting process transmitting request information with transmitting captured image information that is information about a plurality of the captured images for the slide show display to the server system, the captured image being a candidate for an image included in an image set to be displayed in the slide show display,
the reception process receiving an insertion image that has been selected by the server system, and not captured by the image acquisition process, from images stored in the server system based on the transmitted captured image information, the insertion image to be included in the image set generated and sent from the server system in response to the request information, and
the display control process controlling the slide show display of the image set that includes the insertion image selected by the server system and the captured image acquired by the image acquisition process.

5. The terminal device as defined in claim 1,
the terminal device being an imaging device,
the captured image being an image captured by the imaging device.

* * * * *